(12) United States Patent
McCray et al.

(10) Patent No.: US 10,646,007 B2
(45) Date of Patent: May 12, 2020

(54) BAND LATCH MECHANISM

(71) Applicant: Fitbit, Inc., San Francisco, CA (US)

(72) Inventors: Dennis Jacob McCray, San Diego, CA (US); Brian Dennis Paschke, San Francisco, CA (US); Chadwick John Harber, San Francisco, CA (US); Ming-Sheng Ku, Taipei (TW)

(73) Assignee: Fitbit, Inc., San Francisco, CA (US)

( * ) Notice: Subject to any disclaimer, the term of this patent is extended or adjusted under 35 U.S.C. 154(b) by 513 days.

(21) Appl. No.: 15/627,915

(22) Filed: Jun. 20, 2017

(65) Prior Publication Data

US 2018/0289115 A1    Oct. 11, 2018

Related U.S. Application Data

(60) Provisional application No. 62/483,951, filed on Apr. 11, 2017.

(51) Int. Cl.

| | |
|---|---|
| E05C 19/10 | (2006.01) |
| A44C 5/20 | (2006.01) |
| A44B 11/22 | (2006.01) |
| A44B 11/24 | (2006.01) |
| A44C 5/00 | (2006.01) |
| G06F 1/16 | (2006.01) |
| G04G 17/02 | (2006.01) |
| G04G 21/02 | (2010.01) |
| A44C 5/14 | (2006.01) |
| A44C 5/22 | (2006.01) |
| A44B 11/02 | (2006.01) |

(52) U.S. Cl.
CPC ............ *A44C 5/2057* (2013.01); *A44B 11/22* (2013.01); *A44B 11/24* (2013.01); *A44C 5/0007* (2013.01); *A44C 5/0053* (2013.01); *A44C 5/0084* (2013.01); *A44C 5/14* (2013.01); *A44C 5/2071* (2013.01); *A44C 5/22* (2013.01); *G04G 17/02* (2013.01); *G04G 21/025* (2013.01); *G06F 1/163* (2013.01); *A44B 11/02* (2013.01)

(58) Field of Classification Search
CPC ..... A44C 5/2057; G04G 17/02; G04G 17/045
USPC ........................................................ 292/128
See application file for complete search history.

(56) References Cited

U.S. PATENT DOCUMENTS 8,727,189 B2 * 5/2014 Zieman ................. D05B 91/00
223/109 A
2018/0289116 A1   10/2018 McCray et al.

FOREIGN PATENT DOCUMENTS

CN          207754685          8/2018

OTHER PUBLICATIONS

Chinese Office Action dated Apr. 10, 2018, for Chinese Patent Application No. 201721357976.X, filed Oct. 20, 2017.
U.S. Appl. No. 15/820,928, filed Nov. 22, 2017, Nan Xu.

* cited by examiner

*Primary Examiner* — Peguy Jean Pierre
(74) *Attorney, Agent, or Firm* — Weaver Austin Villeneuve & Sampson LLP

(57) ABSTRACT

A band latch mechanism that is configured to connect a wristband to a fitness tracker is provided. The band latch mechanism may be configured to be inserted into a cavity of a housing of the fitness tracker and configured so that any metallic body of the band latch mechanism does not contact metallic surfaces of the cavity in order to prevent an electrical ground from being positioned within a keep-out zone of an antenna of the fitness tracker.

20 Claims, 12 Drawing Sheets

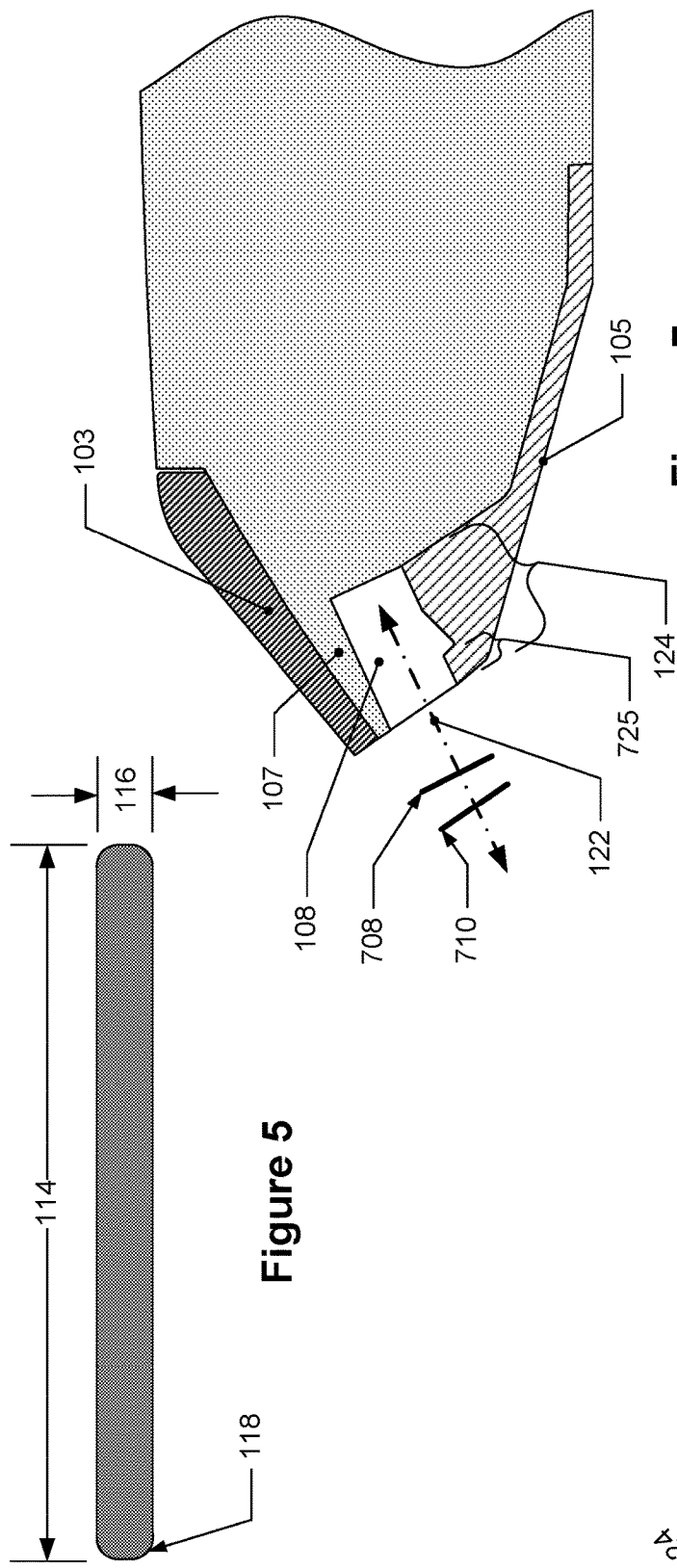
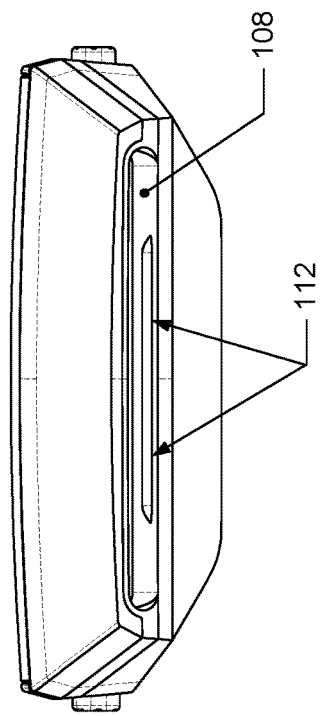
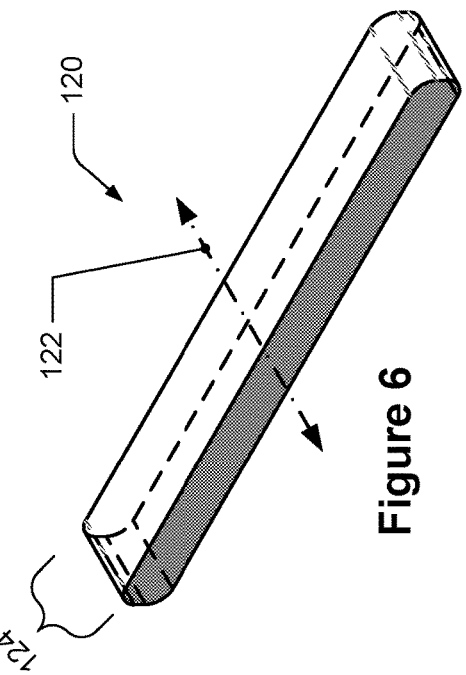

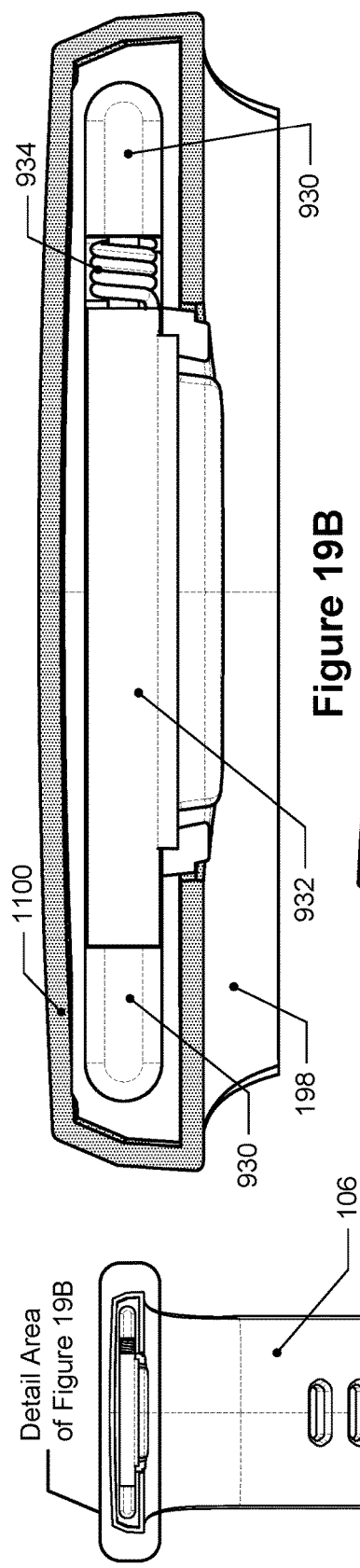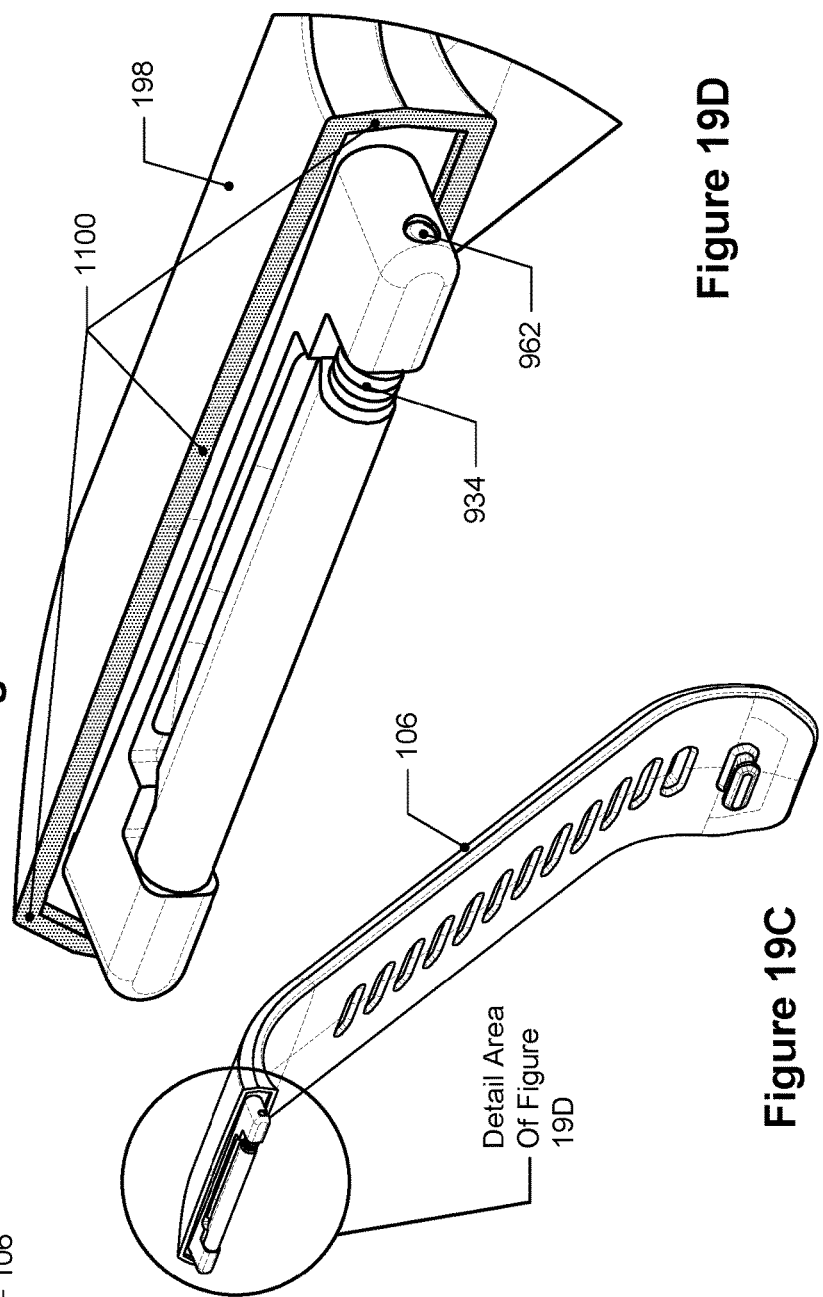

BAND LATCH MECHANISM

CROSS-REFERENCE TO RELATED APPLICATION

This application claims benefit of priority under 35 U.S.C. § 119(e) to U.S. Provisional Patent Application No. 62/483,951, filed Apr. 11, 2017, and titled "WATCH BAND LATCH AND BUCKLE," which is hereby incorporated by reference herein in its entirety.

BACKGROUND

Personal fitness and health monitoring devices, which may be referred to as biometric monitoring devices or fitness trackers herein, may be worn by a user on various locations on the user's body, such as around the user's wrist or ankle. Wristband straps may be attached to a housing of the biometric monitoring device, wrapped around the user's wrist, and joined together to form a loop that may appear to be a bracelet or wristband.

SUMMARY

Details of one or more implementations of the subject matter described in this specification are set forth in the accompanying drawings and the description below. Other features, aspects, and advantages will become apparent from the description, the drawings, and the claims.

In one embodiment, an apparatus may be provided. The apparatus may include a body portion that is configured to be connected to a band and includes a recess with a first cross-sectional area when viewed along a direction perpendicular to a top surface of the body portion, and an insertion portion that extends away from the body portion and is contained within a prismatic reference volume that extends away from the body portion in a first direction. The prismatic reference volume may have a second cross-sectional area in a plane perpendicular to the first direction, the second cross-sectional area may have a rounded-corner rectangular shape of substantially 26.8 millimeters by substantially 2.16 millimeters and corners radiused substantially 0.80 millimeters, and the insertion portion may have at least a third cross-sectional area in a plane perpendicular to the first direction that is circumscribed by the rounded-corner rectangular shape. The apparatus may also include a latching portion that has a latching edge that is configured to be displaceable between a first position and a second position. In the first position, the latching edge may be outside the prismatic volume, and in the second position, the latching edge may be within the prismatic volume. The apparatus may further include a force biasing portion that is configured to cause the latching edge to be in the first position and the recess may be configured to permit the movement of the latching portion between the first position and the second position.

In some embodiments, the insertion portion and the latching portion may both be comprised of a non-metallic material.

In some embodiments, the exterior surface of the insertion portion and the exterior surface of the latching portion may both be comprised of a non-metallic material.

In some embodiments, the surfaces of the insertion portion and the latching portion that contact a housing of a fitness monitoring device when the insertion portion and the latching portion are inserted into a cavity of the housing may be comprised of a non-metallic material.

In some embodiments, in the first position, when the insertion portion and the latching portion are inserted into a cavity of a housing of a fitness monitoring device, the latching edge may be located within a notch of the cavity.

In some embodiments, the latching portion may be rotatably connected to the insertion portion such that the latching portion is rotatable about a rotation axis.

In some such embodiments, the apparatus may further include a pin, the insertion portion may further includes a first protrusion and a second protrusion that are offset from each other in a second direction that is perpendicular to the first direction, the rotation axis may extend between the first protrusion and the second protrusion, a first end of the pin may be positioned in the first protrusion, a second end of the pin may be positioned in the second protrusion, the pin may extend between the first protrusion and the second protrusion, the latching portion may further include a latching body having a hole that extends through the latching body in a direction parallel to the latching edge, and the pin may extends through the hole of the latching body to rotatably connect the latching portion to the first protrusion and the second protrusion, such that the latching portion is rotatable about the pin.

In some further such embodiments, the insertion portion and the latching portion may be both comprised of a non-metallic material, and the force biasing portion and the pin may both be comprised of a metallic material.

In some additional embodiments, the force biasing portion may be within the prismatic reference volume, and the pin may be within the prismatic reference volume.

In some other further such embodiments, the force biasing portion may be a torsion spring, a first end of the torsion spring may be connected to the latching portion, a second end of the torsion spring may contact one or more of the body portion and the insertion portion, a first section of the torsion spring may be coiled around the pin, when the latching edge is in the first position, the torsion spring may be deflected by a first amount, and when the latching portion is in the second position, the torsion spring may be deflected by a second amount that is greater than the first amount.

In some additional embodiments, the torsion spring may have four active coils, a mean coil diameter of substantially 1.35 millimeters, a wire diameter of substantially 0.35 millimeters, and a deflection angle of at least 20 degrees.

In some other such embodiments, the rotational distance between the first position and the second position may be about twenty degrees.

In some embodiments, a first width of the insertion portion may be substantially 26.6 millimeters, a first thickness of the insertion portion may be substantially 2 millimeters, and a first length of the insertion portion may be substantially 3.1 millimeters.

In some embodiments, the latching portion may further include a latching lever that is connected to the latching edge, and the latching lever may have a fourth cross-sectional area in a plane perpendicular to the first direction that is less than the first cross-sectional area of the recess.

In some embodiments, the latching portion may further include a first surface and a second surface that intersect to form the latching edge.

In some such embodiments, the internal angle between the first surface and the second surface may be about 95 degrees or less.

In some embodiments, the body portion may be connected to the band, the band may include a band body portion and a rib, the rib may be comprised of a compliant material, may extend from the band body portion, and may extend around a section of the body portion, the insertion portion, and the latching portion.

In some such embodiments, the rib may be compressible by substantially 0.03 millimeters.

In some embodiments, the latching portion may be contiguous with the insertion portion. In some other embodiments, the latching portion may not be contiguous with the insertion portion.

In some embodiments, the body portion may be contiguous with the insertion portion. In some other embodiments, the body portion may not be contiguous with the insertion portion.

BRIEF DESCRIPTION OF THE DRAWINGS

The various implementations disclosed herein are illustrated by way of example, and not by way of limitation, in the figures of the accompanying drawings, in which like reference numerals refer to similar elements.

FIG. 5 depicts the cross-sectional area of a representational volume.

FIG. 6 depicts an isometric view of the representational volume that is bounded by a cavity of the housing.

FIG. 7 depicts a partial cross-sectional side view of the housing.

FIG. 8 depicts a different front view of the housing of the fitness tracker of FIG. 1.

FIG. 19A depicts a front view of the band latch mechanism connected to a wristband of FIG. 2.

FIG. 19B depicts a detail view of FIG. 19B.

FIG. 19C depicts an off-angle view of the band latch mechanism of FIG. 19A.

FIG. 19D depicts a detail view of FIG. 19C.

FIGS. 1 through 20 are drawn to-scale within each Figure, although not necessarily to the same scale from Figure to Figure.

DETAILED DESCRIPTION

Importantly, the concepts discussed herein are not limited to any single aspect or implementation discussed herein, nor to any combinations and/or permutations of such aspects and/or implementations. Moreover, each of the aspects of the present invention, and/or implementations thereof, may be employed alone or in combination with one or more of the other aspects and/or implementations thereof. For the sake of brevity, many of those permutations and combinations will not be discussed and/or illustrated separately herein.

Biometric monitoring devices, also referred to as fitness trackers, are generally worn on a user's body, such as around the user's wrist or ankle. Many fitness trackers include a housing that houses electronics for monitoring various health-related parameters, including, but not limited to, steps taken, calories burned, etc., as well as for transmitting data relating to such monitored parameters. For those fitness trackers worn around a user's wrist, they may include a wristband that attaches to the housing and is used to secure the fitness tracker around the user's wrist. The wristband may include two wristband straps that are flexible to allow the ends of the wristband straps to be joined together using a buckle component (or other fastening mechanism) to form a loop. When the ends of the wristband straps are joined together, the fitness trackers may appear to be a bracelet or wristband. The housings of such fitness trackers may have identical (or nearly identical) interfaces on each end that may receive features from a wristband strap which enable the wristband strap to be connected to the housing and also be removable from the housing so that replacement wristbands or wristbands of different sizes or styles may be exchanged and connected to the housing.

Figure 2:
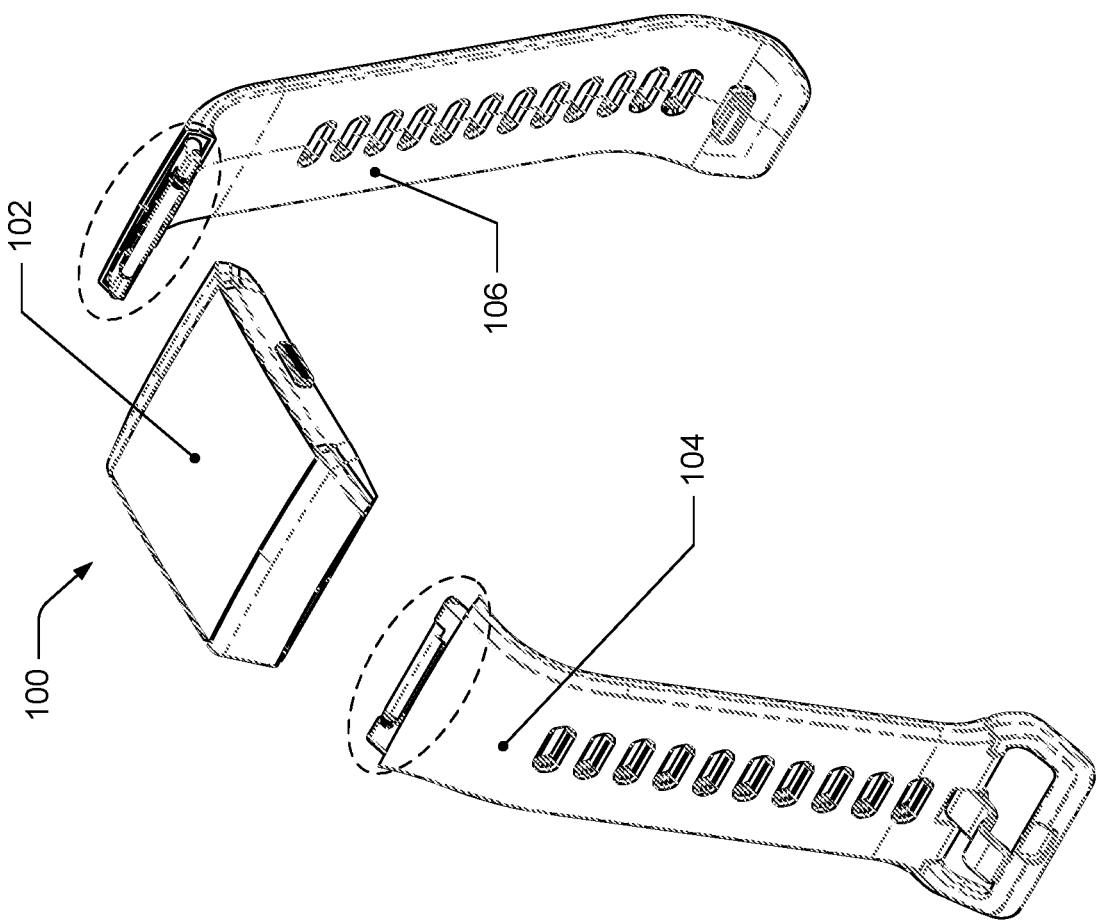
FIG. 2 depicts an exploded isometric view of the fitness tracker of FIG. 1.
Figure 1:
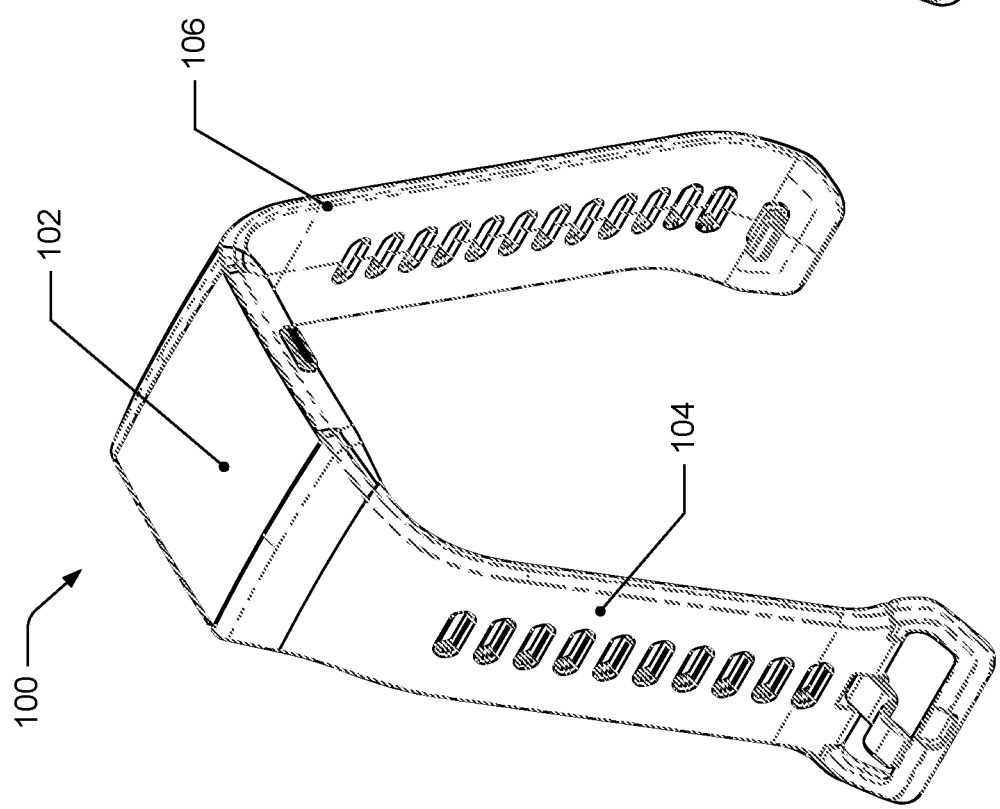
FIG. 1 depicts an isometric view of a fitness tracker.
Figure 3:
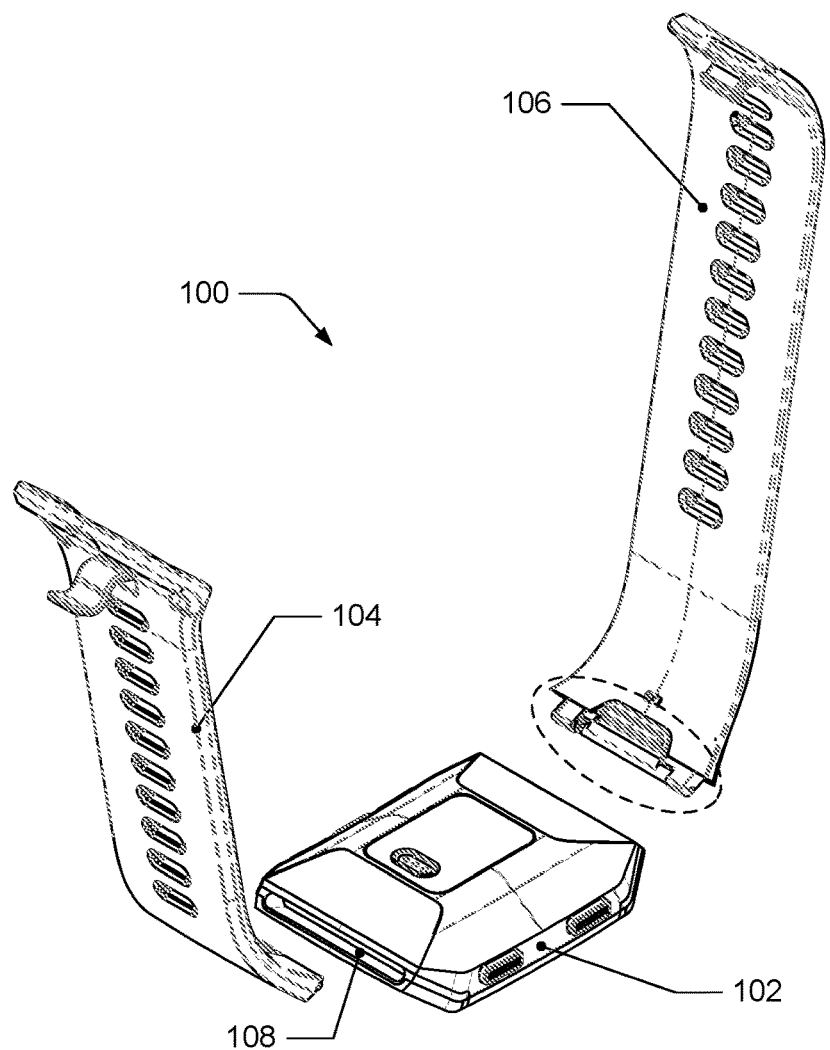
FIG. 3 depicts an exploded off-angle view of the fitness tracker of FIG. 1.

The disclosure herein includes a band latch mechanism that may be used for connecting a wristband strap to a housing of a fitness tracker. FIG. 1 depicts an isometric view of a fitness tracker, FIG. 2 depicts an exploded isometric view of the fitness tracker of FIG. 1, and FIG. 3 depicts an exploded off-angle view of the fitness tracker of FIG. 1. As can be seen in FIGS. 1-3, the fitness tracker 100 includes a housing 102, a first band portion 104, and a second band portion 106. As detailed below, the band latch mechanism is configured to be connected to one of the band portions, inserted into a cavity of the housing, and to connect the band latch mechanism to the housing. Some portions of the band latch mechanism that are configured to be inserted into the cavity and configured to connect to the housing are within with dashed ellipses in FIGS. 2 and 3.

Figure 4:
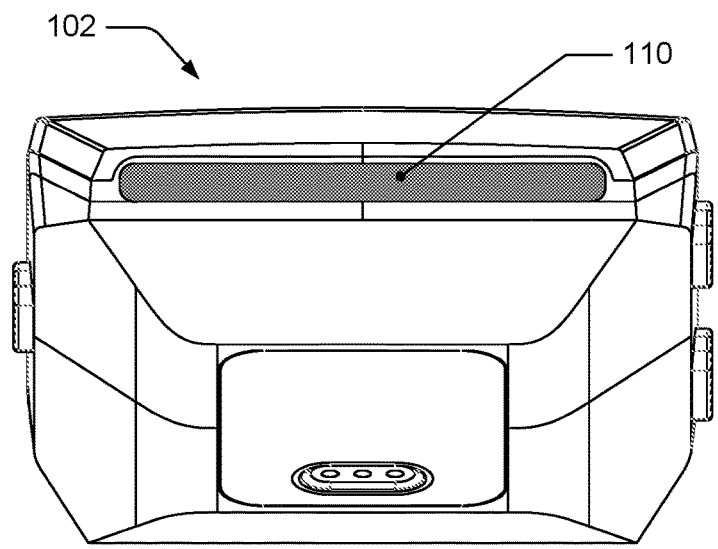
FIG. 4 depicts a view of the housing of the fitness tracker of FIG. 1 along a direction parallel to the direction of insertion for a strap of the fitness tracker.

The cavity 108 is identified in FIG. 3 and discussed in further detail in FIGS. 4-8. The cavity 108 has an opening and cavity walls that bound a representational volume of the cavity 108. The side walls of the cavity 108, not including the back of the cavity opposite the opening, are substantially parallel with each other (e.g., within +/−1% of parallel) such that when the band attachment mechanism is inserted into the cavity 108 along an insertion direction, the insertion direction is substantially parallel to the side walls of the cavity 108. The cross-sectional area of the representational volume in a plane perpendicular to the insertion direction has a shape that is generally rectangular with radiused corners. For instance, FIG. 4 depicts a view of the housing of the fitness tracker of FIG. 1 along a direction parallel to the direction of insertion for a strap of the fitness tracker. The housing 102 is oriented in this Figure such that the view is along the insertion direction of the cavity 108 and the opening 110 of the cavity 108 is identified with shading (the opening 110 also defines a cross-section of the representational volume). FIG. 5 depicts the cross-sectional area of the representational volume which has the generally rectangular shape that includes a length 114, a height 116, and a corner radius 118. In some embodiments, the length 114 may be substantially 28.8 millimeters, the height may be substantially 2.16 millimeters, and the radius may be substantially 0.80 millimeters. For these measurements, "substantially" means within +/−5% of such values.

FIG. 6 depicts an isometric view of the representational volume that is bounded by the cavity of the housing. The representational volume 120 that is bounded by the cavity 108 has a substantially constant cross-sectional area (identified in dark shading) along the insertion direction 122 (and may thus be considered substantially prismatic in shape) for a depth 124, such as at least 3.19 millimeters, for example. As discussed herein, portions of the band latch mechanism are configured to be inserted through the opening 110 and into the cavity 108 of the housing 102. In some instances, the cross-sectional area of the opening 110 of the cavity 18 may not be parallel to the cross-sectional area of the representational volume of the cavity 108. For instance, FIG. 7 depicts a partial cross-sectional side view of the housing. Here, the view is along a direction parallel to the planes in which the cross-sectional areas of the opening 110 and of the representational volume 120 have been taken; the cross-sectional area of the opening 110 of the cavity 18 is represented as line 710 and the cross-sectional area of the representational volume 120 of the cavity 108 is represented as line 708. Lines 710 and 708 are shown as nonparallel to each other with respect to the insertion direction 122. For some fitness trackers, the cross-sectional area of the opening 110, i.e., the surface that is defined by the inner edge of the opening, may not be parallel to the cross-sectional area of the representational volume 120 in a plane perpendicular to the insertion direction 122. Nonetheless, the band latch mechanism is configured to be inserted through the opening 110 and into the cavity 108 in such instances. The depth of the cavity 124 in FIG. 7 may, in some embodiments, measure at least 3.19 millimeters, and the distance 725 between the opening 110 and the boundary of the notch 112 closest to the opening 110 may be about 0.8 millimeters+0.02/−0.05 millimeters.

FIG. 8 depicts a different front view of the housing of the fitness tracker of FIG. 1. The housing 102 is oriented at a lower angle than in FIG. 4 and a notch 112 in the cavity 108 can be seen.

In some example implementations, the housing of the fitness tracker may include a metallic body that forms at least a part of the boundaries of the cavity 108 and a metallic antenna in close proximity to the cavity 108. Referring back to FIG. 7, the antenna 103 is located above the metallic body 105. While many internal aspects of the fitness tracker have been omitted from FIG. 7, a non-metallic material 107, such as a plastic, is seen separating the antenna 103 from the metallic body 105. It was discovered that the performance of the antenna decreased when metallic bodies were positioned within a particular threshold distance or zone from the antenna 103. This may be considered a "keep-out" zone which varies for different antennas. The metallic body 105 is positioned and shaped so that it is outside the keep-out zone of the antenna 103. Although the metallic body 105 is described as metallic, in some embodiments this aspect of the housing may not be metallic, but rather a polymer, a plastic, a composite, or other material that can form a portion of the housing with suitable strength and rigidity, for example. It was further discovered that when a metallic body was inserted into the cavity 108 and made contact with the metallic surface of the cavity 108, the inserted metallic body became an electric ground for the metallic body 105 which caused the inserted metallic body to be within the keep-out zone of the antenna 103 and adversely affected the performance of the antenna 103. However, it was discovered that if a metallic body was inserted into the cavity 108, is within the keep-out zone, but does not make contact with the metallic surfaces of the cavity 108, then the inserted metallic body does not adversely affect the performance of the antenna 103. Accordingly, some embodiments of the band latch mechanism disclosed herein are intended to be inserted into the cavity to enable a wristband to be connected to the housing without having a metallic body contact the metallic surfaces of the cavity while still maintaining an adequate connection to the housing and having sufficient robustness, resilience, and strength.

Figure 9:
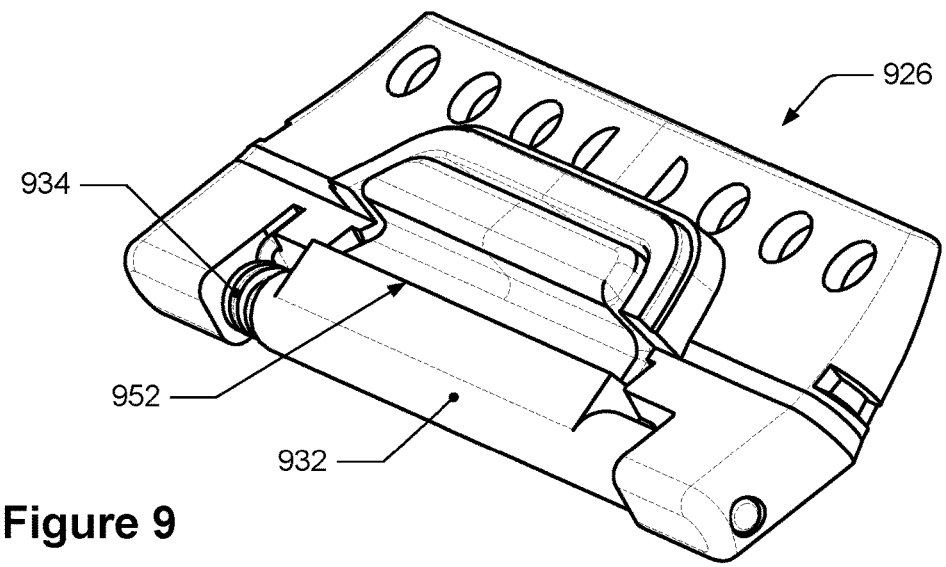
FIG. 9 depicts an off-angle view of an example band latch mechanism.
Figure 10:
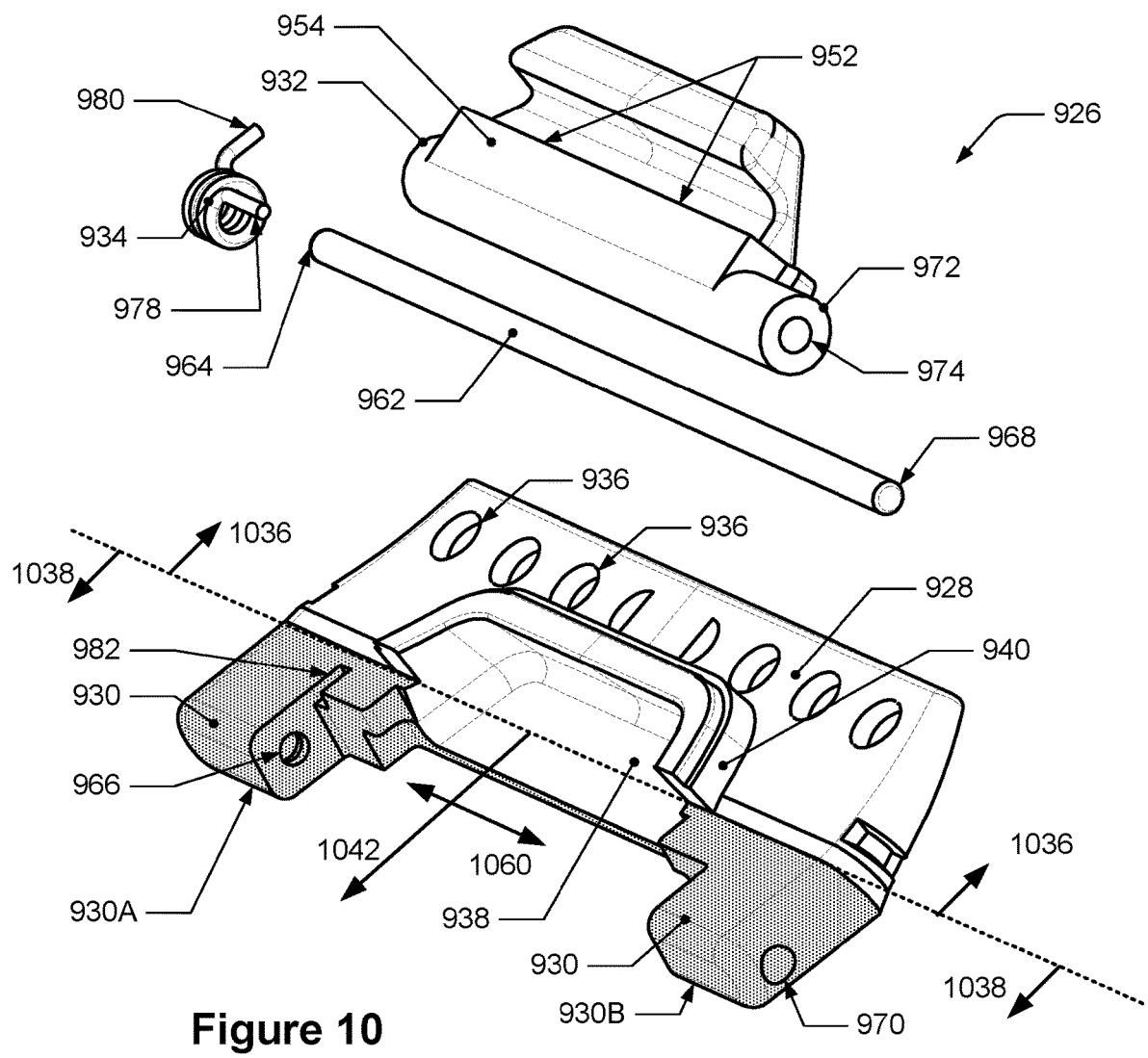
FIG. 10 depicts an exploded view of the band latch mechanism of FIG. 9.

FIG. 9 depicts an off-angle view of an example band latch mechanism and FIG. 10 depicts an exploded view of the band latch mechanism of FIG. 9. As can be seen in FIG. 10, the band latch mechanism 926 includes a body portion 928, an insertion portion 930, a latching portion 932, and a force biasing portion 934. The body portion 928 is seen on the side of the dashed line indicated by arrows 1036, while the insertion portion 930 is seen on the other side of the dashed line indicated by arrows 1038 and highlighted in shading.

In some embodiments, the body portion 928 is configured to be connected to a wristband, which may include having material and/or mechanical properties that enable it to connect with the wristband. For example, the body portion 928 includes a plurality of holes 936 that may be used to connect with a band during a molding or pressing manufacturing process; the body portion 928 may also be comprised of a polymer, composite, or other material that may be molded or pressed, etc.). In some embodiments, the body portion 928 may include mechanical features that enable it to connect with a band, such as protrusions and a pin that enable a fabric wristband to wrap around the pin and be secured to the body portion 928.

In some embodiments, the body portion 928 may also be a part or a component of the wristband itself. For example, the body portion 928 may be a contiguous component of the wristband that may be formed during the manufacturing process of the wristband. In some other embodiments, the body portion may be attached or affixed to the wristband, such as by an adhesive or bonding. Although described in greater detail below, the insertion portion 930 may be a contiguous element of the body portion and it may also be affixed or attached to the body portion 928, such as by mechanical features, an adhesive, or bonding.

Figure 11:
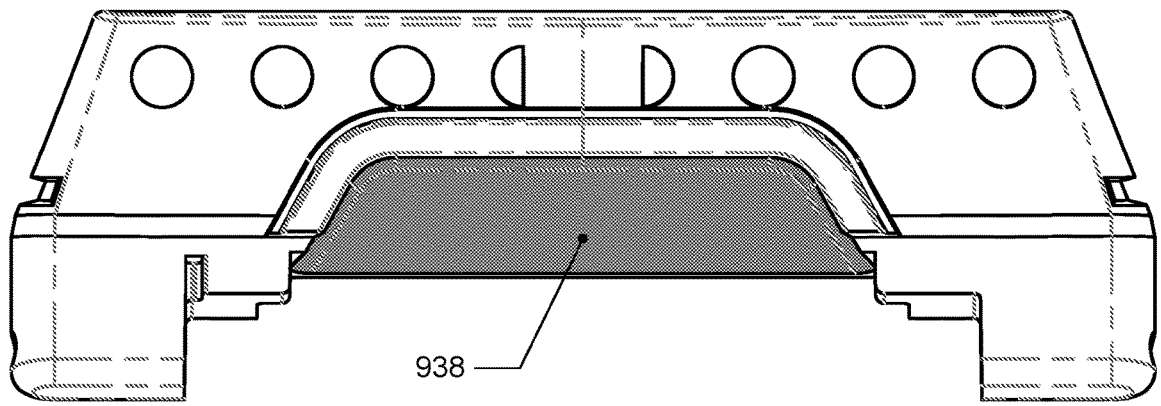
FIG. 11 depicts a top view of a body portion and an insertion portion of the band latch mechanism of FIG. 10.

The body portion 928 may also include a recess 938 that has a first cross-sectional area when viewed along a direction perpendicular to a top surface of the body portion 928. FIG. 11 depicts a top view of a body portion and an insertion portion of the band latch mechanism of FIG. 10. Here, the recess 938 has a first cross-sectional area that is shaded. The shape of the recess 938, including its first cross-sectional area and depth, is configured to permit movement of the latching portion within the recess as described below. The recess may extend partially through the body portion 928 and in some embodiments, it may extend fully through the body portion 928.

The body portion 928 may also include a wall 940 that extends around a part of the recess 938 and forms a part of the recess 938 as seen in FIGS. 10 and 11. The wall 940 may improve the structural integrity of the band latch mechanism 126 after insertion into the cavity. During a molding process of a polymer band material around the band latch mechanism, the wall may 940 prevent such band material from entering the recess 938. The wall 940 may also prevent flash from occurring.

Some embodiments of the insertion portion 930 will now be discussed. The insertion portion 930 is configured to be inserted into the cavity 108 of the fitness tracker 100; this configuration of the insertion portion 930 includes having a shape and size that fits through the opening 110 of the cavity 108 and into and within the cavity 108, including within the representational volume 120 of the cavity 108 described above. In order to do so, in some embodiments the insertion portion 930 is considered to be contained within and/or circumscribed by a prismatic reference volume that, in some embodiments, is circumscribed by the representational volume 120 of the cavity 108. In some embodiments, at least some portions of the insertion portion 930 may be considered contacting the outer boundary of the prismatic reference volume. Additionally, the prismatic reference volume may be understood to be a volume that is either the same as the representational volume 120 or that has exterior surfaces that are offset inwards from the representational volume 120 by a non-zero distance, such as about 0.02 millimeters or about 0.22 millimeters.

Figure 12:
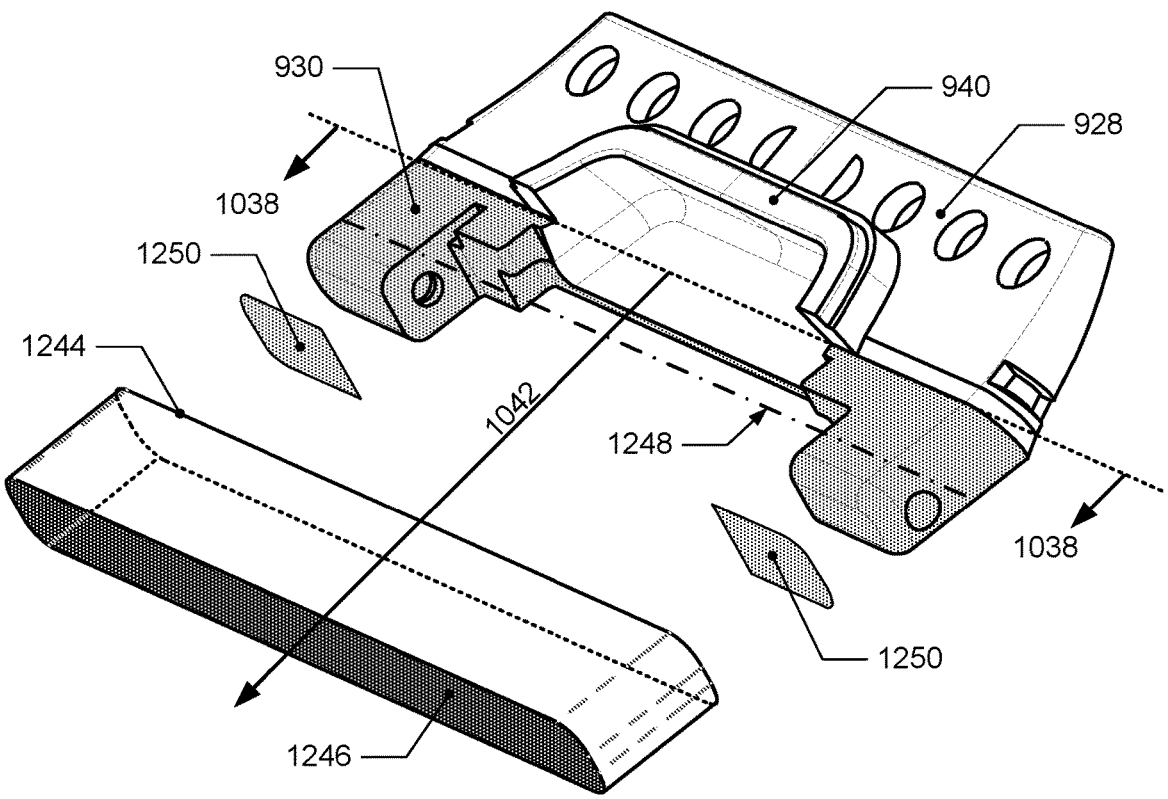
FIG. 12 depicts the body portion and the insertion portion of FIG. 10 and a prismatic reference volume.
Figure 13:
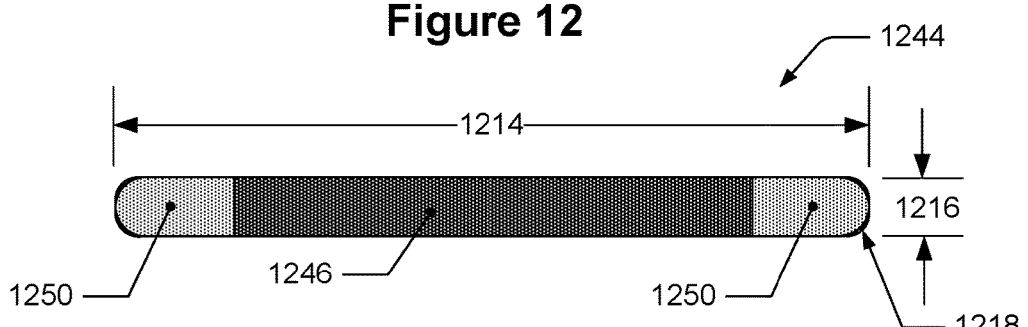
FIG. 13 depicts a second cross-sectional area of the prismatic reference volume along a first direction.

For example, in FIG. 12, which depicts the body portion and the insertion portion of FIG. 10 and a prismatic reference volume, the insertion portion 930 is seen extending away from the body portion 928 in the first direction 1042. In some embodiments, the body portion 928 is contiguous with the insertion portion 930, like in FIG. 12. In some other embodiments, as noted above, the body portion 928 and the insertion portion 930 may be separate bodies that are connected together, such as by an adhesive or other connector, like screws or bolts. The prismatic reference volume 1244 is shown separated from the band latch mechanism for clarity, but the prismatic reference volume 1244 is considered to contain the insertion portion 930 and to extend away from the body portion 928 in the first direction 1042. The prismatic reference volume 1244 has a second cross-sectional area 1246, identified with dark shading, that is in a plane perpendicular to the first direction 1042. FIG. 13 depicts the second cross-sectional area of the prismatic reference volume along the first direction. The shape of the second cross-sectional area 1246 is a rectangular shape like that of the cross-sectional area of the cavity 108 in a plane perpendicular to the insertion direction 122, i.e., the cross-sectional area of the representational volume 120, with a length 1214, a height 1216, and corners with a radius 1218. In some embodiments, the length 1214 of the second cross-sectional area 1246 is substantially 26.8 millimeters, the height 1216 of the second cross-sectional area 1246 is substantially 2.1 millimeters+0.09/−0.05 millimeters, and radius 1218 of the corners of the second cross-sectional area 1246 are substantially 0.80 millimeters. "Substantially" means within +/−5% of the values. In some such embodiments, the length of the insertion portion is substantially 26.6 millimeters, the thickness is substantially 2 millimeters; it may also have a length in the first direction 1042 that is substantially 3.1 millimeters. "Substantially" here means within +/−5% of the values.

The outer boundary of the second cross-sectional area 1246 circumscribes, or extends around, the outer boundary of the insertion portion 930 in a plane perpendicular to the first direction 1042. For example, when viewed along the first direction, the cross-sectional area of the insertion portion 930 in a plane perpendicular to the first direction 1042 is contained by the second cross-sectional area 1246. In some embodiments, the boundary of the second cross-sectional area 1246 may circumscribe at least some parts of the cross-sectional area of the insertion portion 930 in a plane perpendicular to the first direction such that, for instance, at least some parts of the cross-sectional area of the insertion portion are touching the second cross-sectional area 1246. Referring back to FIG. 12, a cross-sectional slice of the insertion portion 930 has been taken in a plane perpendicular to the first direction 1042 along line 1248 and is identified with light shading and identified 1250. FIG. 13 also depicts the cross-sectional slice 950 of the insertion portion 930 and as can be seen, this cross-sectional slice, i.e., a third cross-sectional area of the insertion portion 930, includes two separated areas which together are contained within the second cross-sectional area 1246. Other cross-sectional areas (not shown) of the insertion portion 930 are likewise contained within the second cross-sectional area 1246; in other words, these other cross-sectional areas are circumscribed by the boundary of the rounded-corner shape of the second cross-sectional area 1246.

In some embodiments, the cross-sectional areas of the insertion portion may be of a different shape than shape depicted in the Figures, but may nonetheless still be considered contained within, and in some embodiments circumscribed by, the rounded-corner shape of the prismatic reference volume 1244. For instance, the insertion portion 930 may have a cross-sectional shape that includes square-corners or that may be a circle, but the cross-sectional shape is still sized and configured such that it is contained within, or even circumscribed by, the rounded-corner shape of the prismatic reference volume 1244.

Figure 14:
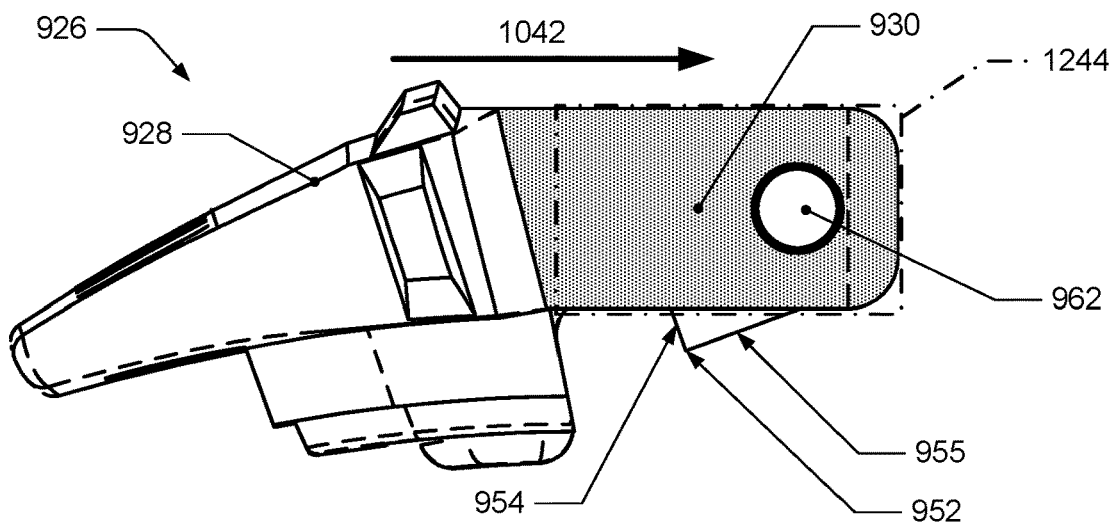
FIG. 14 depicts a side view of the band latch mechanism of FIG. 9.

Some embodiments of the latching portion 932 will now be discussed. The latching portion has an edge that is configured to latch with and connect to the notch of the housing; the edge may also be referred to as a "latching edge." The latching edge is configured to be moveable, i.e., displaceable, between at least two positions such that the latching edge may move through the opening of the cavity and into the notch of the cavity. The latching edge 952 can be seen in FIGS. 9 and 10. Additionally, FIG. 14 depicts a side view of the band latch mechanism of FIG. 9 which is a view along the latching edge. As can be seen, the insertion portion 930 (shaded) extends in the first direction 1042 and is contained within the prismatic reference volume 1244 which is represented as a dash-dot-dash boundary line. The latching edge 952 of the latching portion 932 is seen outside this prismatic reference volume 1244. In some embodiments, like that in FIG. 14, the latching portion 932 may include a first surface 954 and a second surface 955 that intersect to form the latching edge 952. The internal angle between the first surface 954 and the second surface 955 may be about 95 degrees or less.

Figure 15:
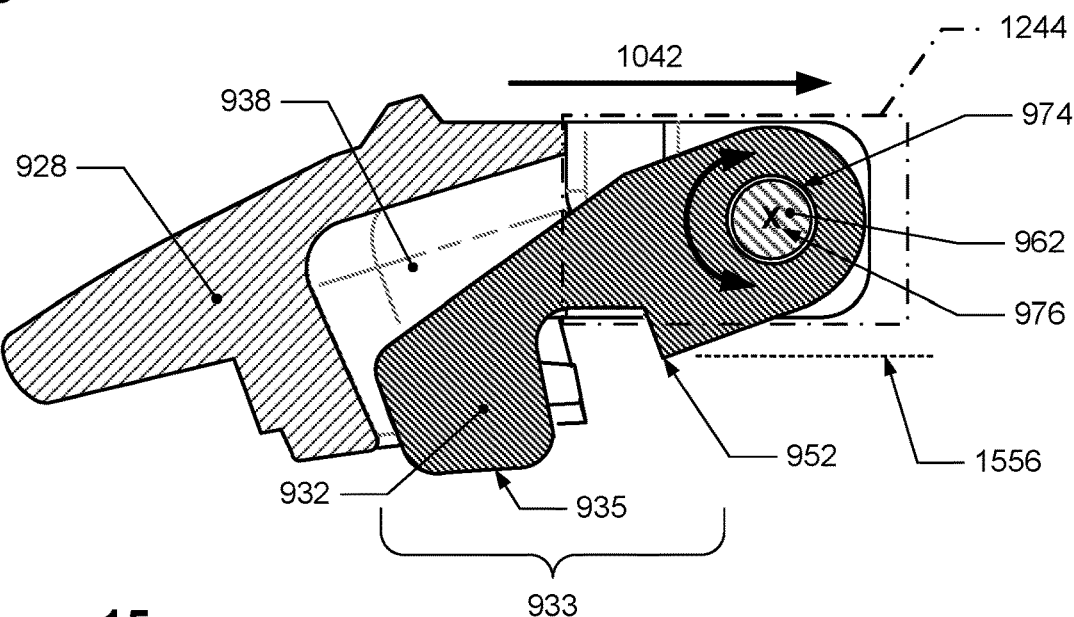
FIG. 15 depicts a cross-sectional side view of the band latch mechanism of FIG. 14 with a latching edge of a latching portion in a first position.
Figure 16:
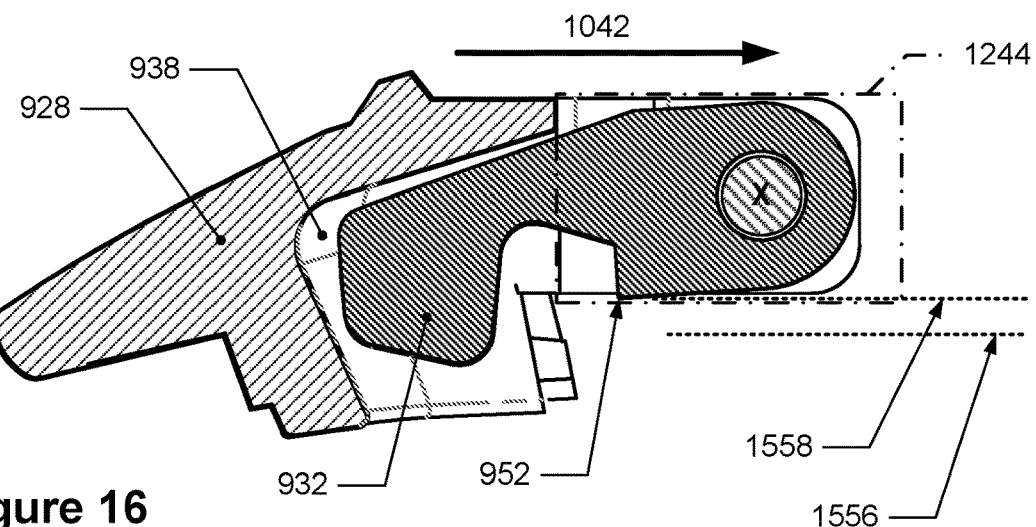
FIG. 16 depicts a cross-sectional side view of the band latch mechanism of FIG. 14 with the latching edge of the latching portion in a second position.

FIG. 15 depicts a cross-sectional side view of the band latch mechanism of FIG. 14 with the latching edge of the latching portion in a first position while FIG. 16 depicts a cross-sectional side view of the band latch mechanism of FIG. 14 with the latching edge of the latching portion in a second position. In FIG. 15, the cross-section has been taken in a plane along a centerline of the band latch mechanism in a direction parallel to the first direction 1042 and perpendicular to a rotational axis of the latching portion. The recess 938 of the body portion 928 can be seen and a part of the latching portion 932 is positioned within the recess 938. The latching edge 952 of the latching portion 932 is seen at a first position 1556, which is represented by the horizontal dashed line parallel to the first direction 1042. As can be seen, when the latching edge 952 is in the first position 1556, the latching edge 952 is located outside the boundary of the prismatic reference volume 1244 and may also be considered outside the representational volume 120 of the cavity 108.

In FIG. 16, the latching portion 932 has moved such that the latching edge 952 is in the second position 1558, which is represented by the horizontal dashed line parallel to the first direction 1042. When in the second position 1558, the latching edge 952 is located within the prismatic reference volume 1244 which enables the insertion portion 1530 and the part of the latching portion 1532 that includes the latching edge 952 to be inserted into the cavity 108. The displacement of the latching edge 952 between the first position 1556 and the second position 1558 may be considered to be in a direction perpendicular to the first direction 1042. As can also be seen in FIG. 16, the recess 938 is configured to permit the movement of the latching portion 932 such that more of the latching portion 932 is located within the recess 938 when the latching edge 952 is in the second position 1558.

The band latch mechanism 926, including the latching portion 932, may be configured in a variety of ways in order to have the latching edge move between positions, including the first position and the second position. In some embodiments, the latching portion of the band latch mechanism may be rotatably connected to the body portion and/or the insertion portion such that the latching portion is rotatable about a rotation axis and which in turn moves the latching edge between at least the first position and the second position. For example, in the embodiment shown in FIGS. 9-16, the latching portion 932 is rotatably connected to the insertion portion 930 and the insertion portion 930 is configured for such connection.

For example, in FIG. 10 the insertion portion 930 includes a first protrusion 930A and a second protrusion 930B which are offset from each other in a direction 1060 that is perpendicular to the first direction 1042 so that a gap exists between each protrusion. The band latch mechanism 926 may also include a pin which extends through the latching portion, is positioned within each protrusion of the insertion portion, and is the physical member about which the latching portion rotates (or that defines the center axis about which the latching portion rotates). A pin 962 can be seen in the exploded view of FIG. 10. When assembled, a first end 964 of the pin 962 is positioned in a first hole 966 of the first protrusion 930A and a second end 968 of the pin 962 is located in a second hole 970 of the second protrusion 930B. The latching portion 932 also includes a latching body 972 that has a latching hole 974 that extends through the latching body 972. When the band latch mechanism is assembled, the pin 962 extends through the latching hole 974 and the latching portion 932 rotates around the pin 962. The latching portion 932 rotates about a rotation axis which extends between the first protrusion 930A and the second protrusion 930B. The rotation axis may be located in various positions, such as collinear with the center axis of the latching hole 974, collinear with the center axis of the pin 962, parallel to but offset from the center axis of the pin 962, and/or parallel to the center axis of the pin 962.

Viewed from a different perspective, in FIGS. 14 and 15 the pin 962 is seen positioned within the latching hole 974. The rotation axis, which is shown as an "x" and identified with 976, is collinear with both the center axis of the pin 962 and the center axis of the latching hole 974. The latching portion 932 rotates about pin 962, as indicated by the curved double-sided arrow, thereby causing the latching edge 952 to move between the first position 1556 and the second position 1558. In some embodiments, the rotational distance between the first position and the second position is substantially 20 degrees. Here, "substantially" means within +/−10% of the value.

The band latch mechanism may also include a force biasing portion, such as a spring, that is configured to apply a force to the latching portion to enable the latching portion to move between multiple positions when subjected to an external force, e.g., pressure applied by a user's finger, and return to a starting position when the external force is released. The configuration of the force biasing portion causes the latching edge of the latching portion to move into and remain within the notch of the cavity of the housing, thereby causing the band latch mechanism to be connected with the housing. For example, referring to FIGS. 15 and 16, a force biasing portion exerts a force onto the latching portion 932 which causes the latching portion to remain in the first position 1556, but when an external force that is greater than the force applied by the force biasing portion is applied to the latching portion, such as a force by a user onto the latching portion, the latching portion 932 is caused to move to the second position 1558, albeit under resistance applied by the force biasing portion. Once the external force is no longer applied to the latching portion 932, the force biasing portion causes the latching portion 932 to return to the first position 1556. The force biasing portion may be any suitable material and configuration that applies a force to and enables the movement of the latching portion as described herein, e.g., enables the movement of the latching portion between multiple positions when subjected to an external force and return to a starting position when the external force is released. For instance, the force biasing portion may be a spring, a torsional spring, a hinge, or elastically deformable material such as rubber; the force biasing portion may also be a metal, polymer, plastic, composite, polycarbonate, or other suitable material.

For example, in some embodiments, the latching portion 932 may include a latching lever that is connected to the latching edge. A section 933 in FIG. 15 may be considered the latching lever 933 which is connected to the latching edge 952. The latching lever 933 is configured to cause, when a force is applied to a button surface 935 of the latching lever 933, the displacement of the latching edge 952 from the first position 1556 to another position between and including the second position 1558. When the latching edge 1552 has been displaced from the first position and moved to another position, such the second position 1558, and the force of the user is removed from the latching lever 933, then the force biasing portion 934 causes the latching edge 952 to move back to the first position 1556 (assuming that no other body obstructs this movement).

Additionally, referring back to FIGS. 9 and 10, the depicted force biasing portion 934 of the band latch mechanism 926 is a 90 degree tangential torsion spring (referred hereinafter as "spring 934") that is wrapped around the pin 962. The spring 934 has a first end 978 that is connected to the latching portion 932, such as by being inserted into another hole in the latching portion 932, affixed to the latching portion (e.g., by an adhesive), or being molded into the latching portion 932. The spring 934 also has a second end 980 that contacts the insertion portion 930 or the body portion 928, such as a second recess 982 of the body portion 928. The spring 934 is thereby configured to apply a rotational spring force that enables latching portion 932 to rotate about a rotational axis as well as return to a starting position. In some embodiments, the torsion spring 934 may have four active coils, a mean coil diameter of substantially 1.35 millimeters, a wire diameter of substantially 0.35 millimeters, and a deflection angle of at least 20 degrees. "Substantially" here means within +/−10% of the listed values.

The latching lever 933 may also be configured to fit within the prismatic reference volume 1244 so that it may be inserted into the cavity 108. As can be seen in FIGS. 15 and 16, for example, the cross-sectional area of the latching lever 933 in a plane perpendicular to the first direction 1042 is less than the cross-sectional area of the cavity 108 in a plane along the insertion direction and of the prismatic reference volume 1244. Additionally, the latching lever 933 is configured to fit within the recess 938 so that the latching lever 933 and latching portion 932 may move within the recess as described above. In some such embodiments, the latching lever 933 has a fourth cross-sectional area in a plane parallel to the first direction that is less than, or fits within, the first cross-sectional area of the recess 938.

Figure 17A:
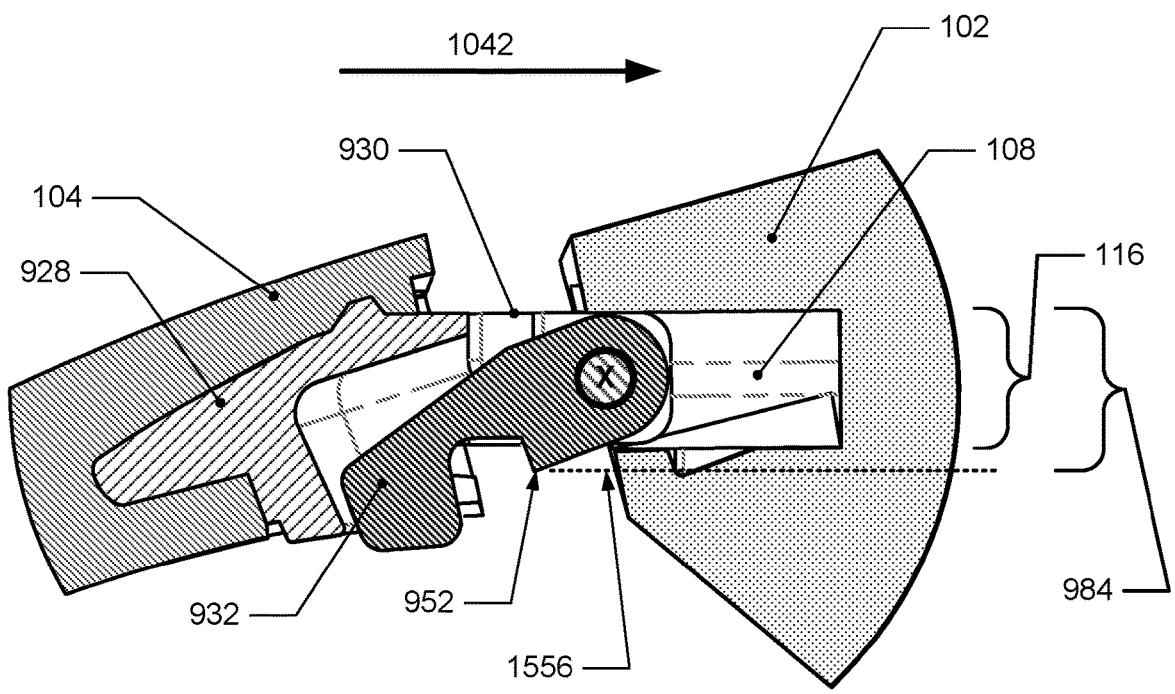
FIGS. 17A-17D depict cross-sectional side views of an example insertion sequence of the band latch mechanism into the housing.

The above-described movements and configurations of the band latch mechanism enable the insertion portion and the latching portion to be inserted into the cavity and for the band latch mechanism to be attached to the housing. For instance, FIGS. 17A-17D depict cross-sectional side views of an example insertion sequence of the band latch mechanism into the housing. In these Figures, the body portion 928 has been connected to a band portion 104. In FIG. 17A, the band latch mechanism in positioned like in FIG. 15 such that the latching edge 952 of the latching portion 932 is in the first position 1556 as caused by the force biasing portion (not seen). In some embodiments, when the latching edge 952 is in the first position 1556, the force biasing portion, such as the spring 934, may be deflected by a first amount, which may include zero. Some of the insertion portion 930 and the latching portion 932 have been moved through the opening of cavity 108 and into the cavity 108 in the first direction 1042 (which may also be considered the insertion direction 122). As can be seen, with the latching edge 952 in the first position 1556, the latching portion 932 prevents the insertion of the band latch mechanism fully into the cavity 108. In some such embodiments, like can be seen in FIG. 17A, a first effective height 984 of the latching portion 932 measured between a top surface of the latching portion 932 and the latching edge 952 in a direction perpendicular to the first direction 1042 is larger than the height 116 of the opening 110 as well as the height of the cavity. The cross-sectional area of the latching portion 932 in a plane perpendicular to the first direction 1042 while the latching edge 952 is in the first position 1556 may also be considered larger than the cross-sectional area of the opening 110.

Figure 17B:
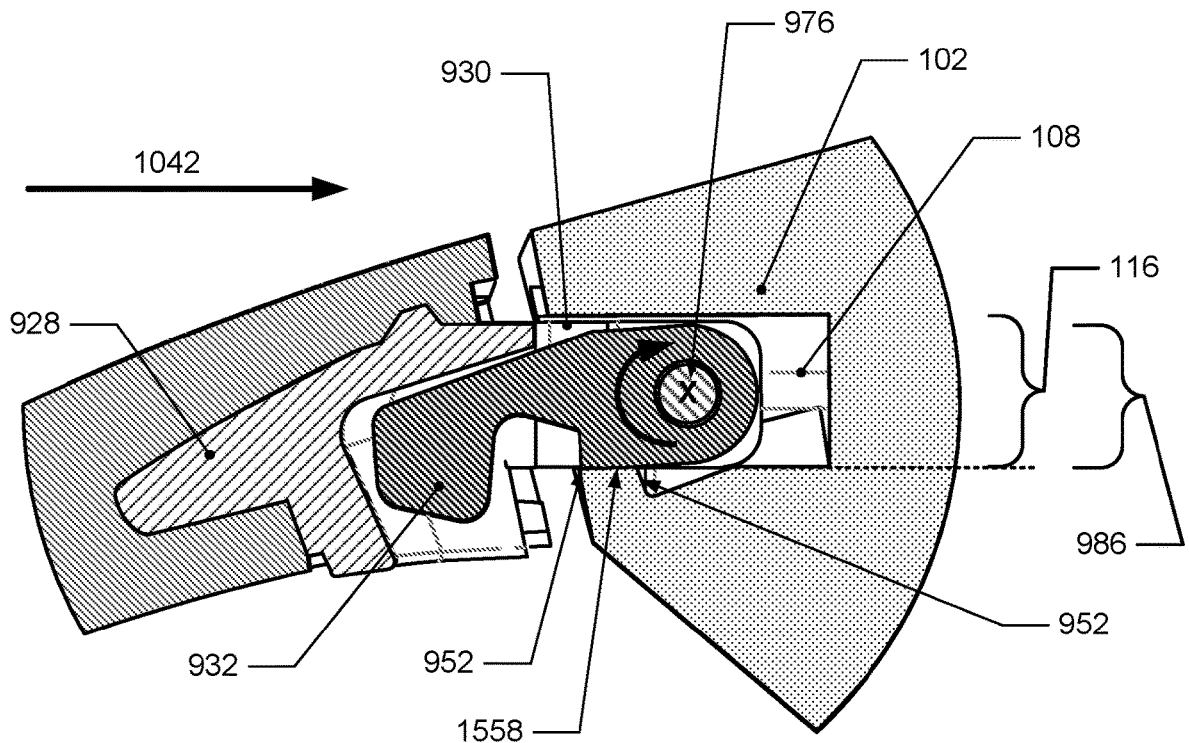

When a force is applied to the latching portion, such as by a user directly on the latching portion or a user moving the insertion portion into the cavity, that is greater than the spring biasing force, then the latching edge can be moved in to the second position and the band latch mechanism can be inserted farther into the cavity like in FIG. 17B. Here, the band latch mechanism in positioned like in FIG. 16 such that the latching edge 952 of the latching portion 932 is in the second position 1558. More of the insertion portion 930 and the latching portion 932 have been moved through the opening of cavity 108 and into the cavity 108. The movement of latching portion 932 so that the latching edge 952 is in the second position 1558 enables the latching edge 952 and more of the latching portion 932 and the insertion portion 930 to move through the opening and into the cavity 108. Like described above, in FIG. 17B the latching portion 132 has rotated clockwise about the rotational axis 976 as indicated by the arrow thereby causing the latching edge 952 to move from the first position 1556 to the second position 1558. In some such embodiments, like in FIG. 17B, when the latching edge 952 is in the second position 1558, a second effective height 986 of the latching portion 932 measured between a top surface of the latching portion 932 and the latching edge 952 in a direction perpendicular to the first direction 1042 is less than the height 116 of the opening 110 as well as the height of the cavity. Additionally, when the latching portion 932 is in the second position 1558, the force biasing portion, such as spring 934, is deflected by a second amount that is greater than the first amount.

Figure 17C:
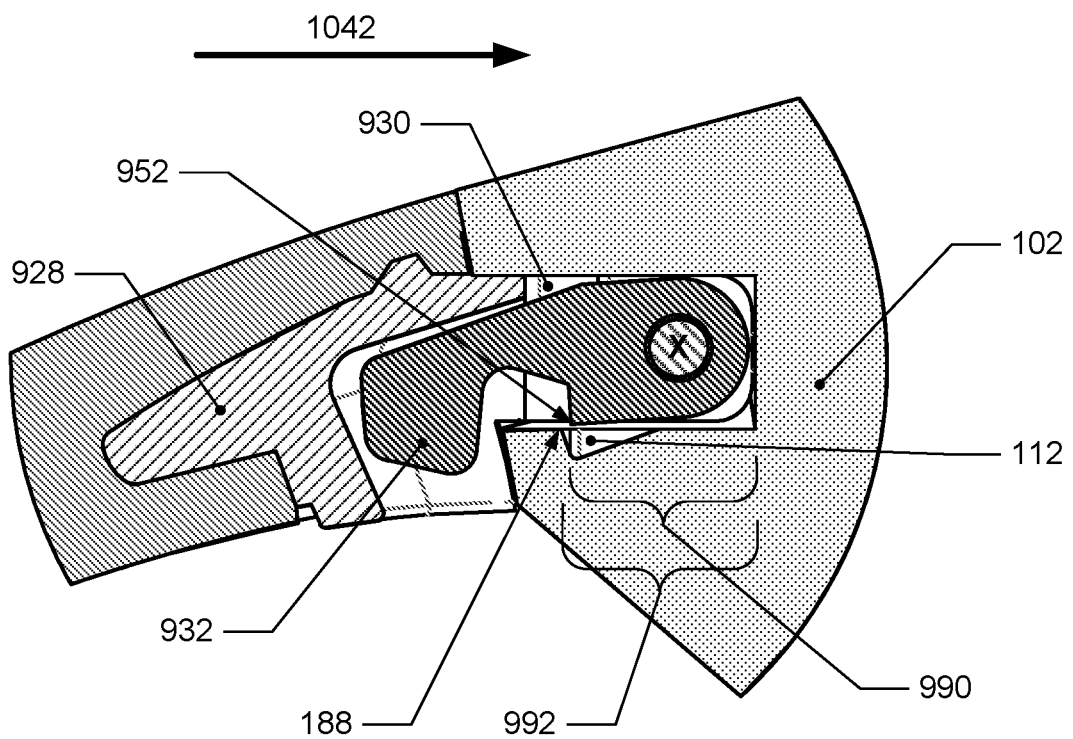
Figure 17D:
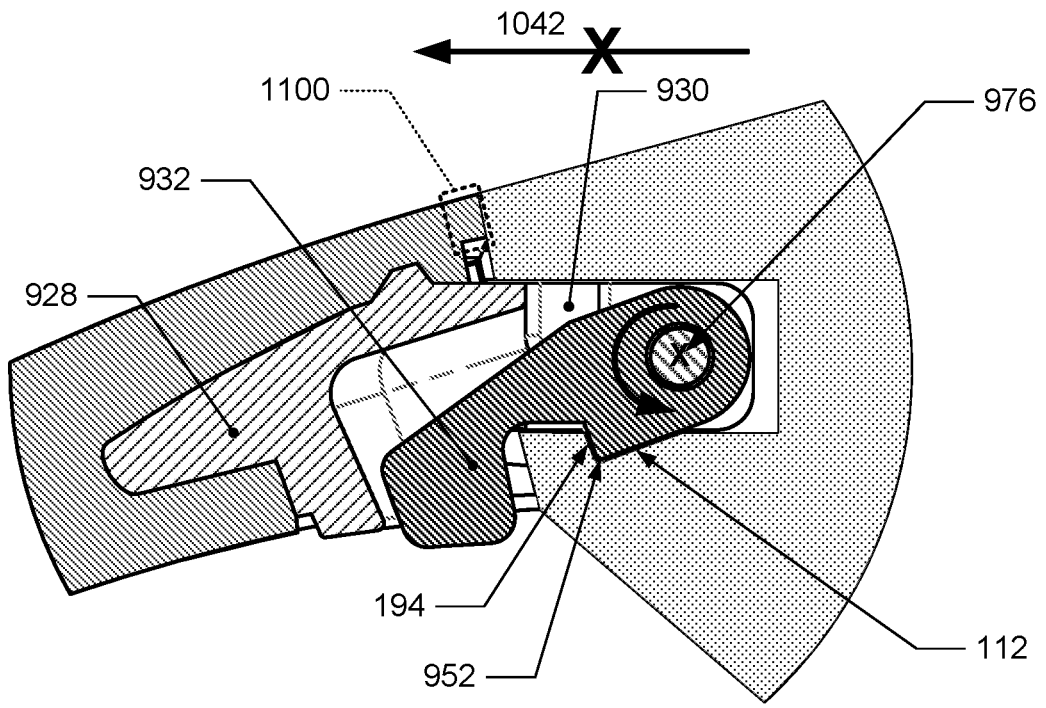
Figure 18:
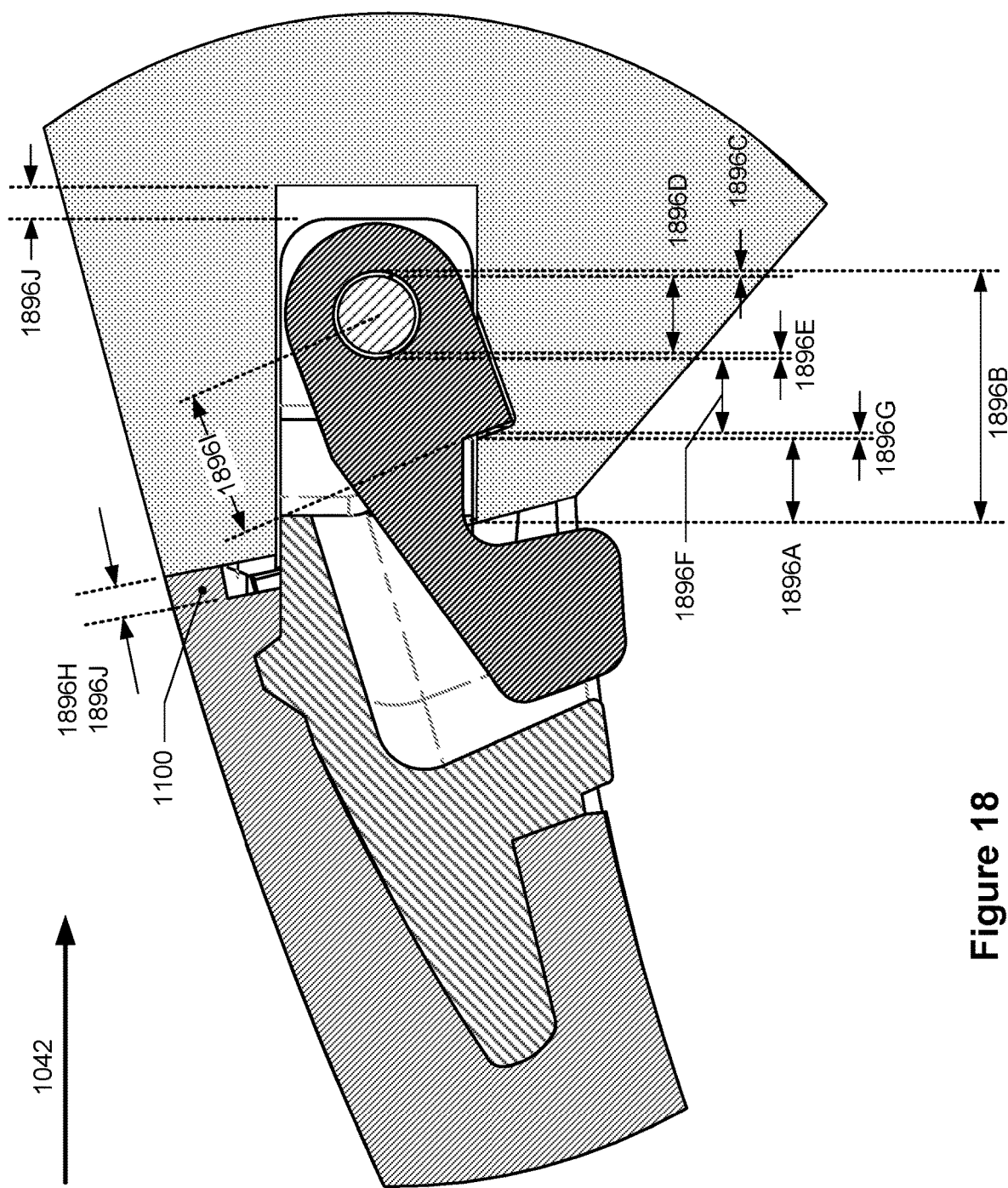
FIG. 18 depicts the cross-sectional side view of the band latch mechanism inserted into the housing like in FIG. 17D.

In FIG. 17C, the band latch mechanism has been moved farther into the cavity 108 in the first direction 1042 so that the latching edge 952 may be positioned within the notch 112 like in FIG. 17D. In order for the latching edge 952 to be positioned within the notch 112, the insertion portion 930 and the latching portion 132 are sized so that the latching edge 952 can move in the first direction 1042 past a section of the notch boundary 188 that is closest to the opening and then move in a direction with a component perpendicular to the first direction 1042 and into the notch 112. For example, in some embodiments, the depth 990 of the insertion portion 930 in the first direction 1042 as measured between the front surface of the insertion portion 132 and the latching edge 152 when the latching edge 952 is in the second position 1558 is less than a distance 192 between the end of the cavity 108 and the notch boundary 188. Some example measurements are provided in FIG. 18 below.

In FIG. 17D, the latching edge 952 is positioned within the notch 112 of the cavity 108 of the housing 102. Like described above, the force biasing portion (not seen) has caused the latching portion 132 to rotate in a counter clockwise direction about the rotational axis 976, as indicated by the curved arrow, so that the latching edge 952 is forced to be within the notch 112. The band latch mechanism has also been moved in the first direction 1042 as indicated by the arrow 1042, e.g., towards the left of the Figure and towards the opening of the cavity. In some embodiments, like that shown in FIG. 17D, the first surface 954 of the latching portion 132 may engage with a notch surface 194 of the notch 112 (also identified in FIG. 17B) which prevents the band latch mechanism from being removed from the cavity, such as when a force is applied to the band latch mechanism and/or band in the first direction 1042 as indicated in FIG. 17D. In some embodiments, when the latching edge is located within the notch 112 of the cavity 108, the latching edge 952 may be located in the first position 156 as well as in other positions between the first position 156 and the second position 158.

As mentioned above, the size and shape of the insertion portion and the latching portion are configured to fit within the cavity of the housing so that the latching edge of the latching portion may be positioned within the notch. Such configuration includes, for example, the measurements described above as well as those shown in FIG. 18 which depicts the cross-sectional side view of the band latch mechanism inserted into the housing like in FIG. 17D. As can be seen, various dimensions 1896A-1896G are provided: 1896A is the distance between the opening of the cavity and the notch, 1896B is the edge of the opening of the cavity to the edge of the holes in the insertion portion, 1896C is the gap between the pin and the holes in the insertion portion, 1896D is the pin diameter, 1896E is the gap between the pin and the hole in the latching portion, 1896F is the distance between the hole in the latching portion and the first surface of the latching portion, and 1896G is the gap between the notch surface and the first surface of the latching portion. For clarity, only these items are identified in FIG. 18; the other depicted items have been previously identified. In some embodiments, 1896A is 0.72 millimeters+/−0.25 millimeters, 1896B is 2.47 millimeters+/−0.05 millimeters, 1896C is 0 millimeters+/−0 millimeters, 1896D is 0.8 millimeters+/−0.03 millimeters, 1896E is 0.05 millimeters+/−0.1 millimeters, 1896F is 0.85 millimeters+/−0.04 millimeters, and 1896G is 0.05 millimeters+/−0.370 millimeters. Additionally, a distance 1896I between the center of the hole of the latching portion 932 and the latching edge 952 may be substantially 1.53 millimeters. In some embodiments, the configuration of the band latch mechanism, including the aforementioned measurements, may result in a space 1896J (which may also be distance 1896H, discussed below) between the front of the insertion portion 930 and the back wall of the cavity 108 and between the end of a rib 1100, discussed below, and the band 106 which also results in a tolerance in the insertion direction 1042, both of which enable the band latch mechanism to be inserted into the cavity 108 and latch to the housing 102. In some embodiments, the space 1896J is substantially 0.35 millimeters and the tolerance is substantially 0.16 millimeters. "Substantially" herein means within +/−5%.

In some of the embodiments in which the band latch mechanism includes one or more metallic surfaces, the band latch mechanism is configured so that none of the metallic surfaces contact the metallic surfaces of the cavity 108 of the housing 102. For example, referring back to FIGS. 9 and 10, the insertion portion 930 and the latching portion 932 may both be comprised of one or more non-metallic materials, such as a polymer, thermoplastic polymer, polycarbonate, composite, or other material that enables the insertion portion 930 and the latching portion 932 to be configured, insertable, and moveable as described herein. In some other embodiments, the insertion portion 930 and the latching portion 932 may be made of a metallic material but coated with a non-metallic coating so that the exterior surfaces of these portions are non-metallic. Additionally, in some embodiments, the exterior surfaces of the insertion portion 930 and the latching portion 932 that contact any portion of the metallic surfaces of the cavity 108 may be comprised of a non-metallic material. Similarly, the body portion 128 may also be comprised of a non-metallic material and may also have exterior surfaces that are non-metallic.

Figure 19F:
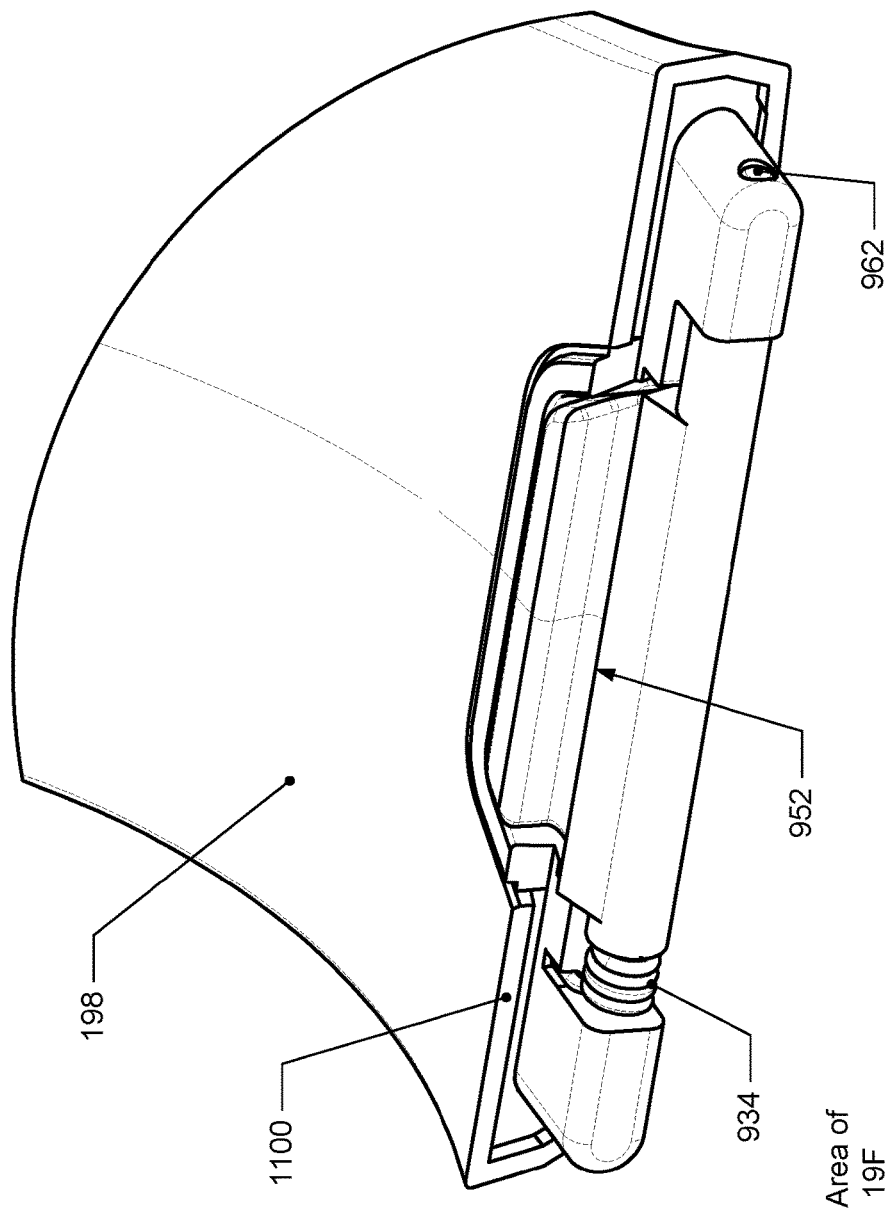
FIG. 19F depicts a detail view of FIG. 19E.

The pin 962 and/or the force biasing portion 934 shown in FIGS. 9 and 10 and discussed above may, in some embodiments, be comprised of a metallic material, such as stainless steel or steel. In some embodiments, the pin and/or the force biasing portion may be comprised of a non-metallic material, such as a polymer, plastic, or polycarbonate, or any other material that may enable the latching portion to be rotatable and moveable as described herein. In such embodiments, the band latch mechanism is configured so that any metallic surface of pin 962 and the force biasing portion 934 do not contact any of the metallic surfaces of the cavity of the housing. For example, such configuration includes the force biasing portion 934 and the pin 962 both being contained within the prismatic reference volume 944. As can be seen in FIG. 9, for instance, the pin 962 does not extend beyond the outer boundary of the insertion portion 930. Similarly, in FIGS. 17A-17D, the spring 934 is not seen because it does not extend outside the prismatic reference volume. FIGS. 19B, 19D, and 19F also show the pin 962 (not labeled) and the spring 934 not extending past the outer boundaries of the insertion portion and not extending outside the prismatic reference volume (not shown).

Figure 19E:
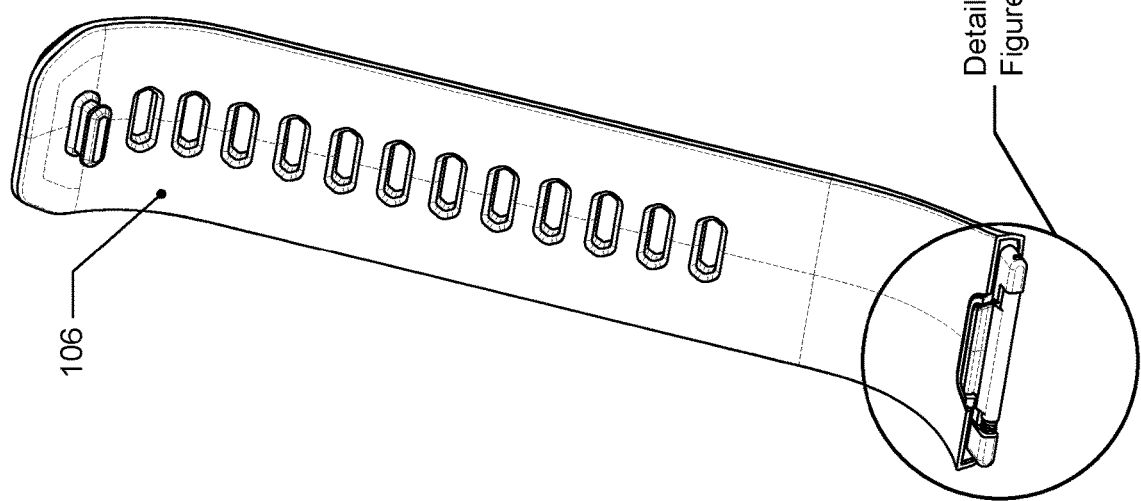
FIG. 19E depicts another off-angle view of the band latch mechanism of FIG. 19A.

As stated above, the body portion of the band latch mechanism may be connected to a band as illustrated in FIGS. 19A-19F. FIG. 19A depicts a front view of the band latch mechanism connected to a wristband of FIG. 2, FIG. 19B depicts a detail view of FIG. 19B, FIG. 19C depicts an off-angle view of the band latch mechanism of FIG. 19A, FIG. 19D depicts a detail view of FIG. 19C, FIG. 19E depicts another off-angle view of the band latch mechanism of FIG. 19A, and FIG. 19F depicts a detail view of FIG. 19E. In FIGS. 19A-19F, the body portion is embedded within the band 106, which is the second band portion of FIGS. 1-3.

As can also be seen in these Figures, the insertion portion 930 extends out and away from the band 106. In some embodiments, the band includes a band body portion 1998 and a rib 1100 that extends from the band body portion 1998, as identified with shading in FIGS. 19B and 19D, for example. In some embodiments, the rib 1100 extends around a section of the body portion, the latching portion, and/or the insertion portion. For instance, as can be seen in FIG. 19B, which is a view along the first direction, the rib 1100 extends around some of the body portion (not shown), the latching portion 932, and the insertion portion 930, but not fully around these portions at this angle. This allows for the movement of the latching portion 132 as described above.

In some embodiments, the rib 1100 may also be comprised of a compliant material, such as an elastomeric polymer, rubber, or fabric, or any other material that allows it to be compressed as described herein. The compliance, or compressibility, of the rib 1100 may assist in securing the band latch mechanism and band to the housing. For instance, referring back to FIG. 17D, the rib 1100 is located within the dashed rectangular box. The presence of the rib 1100 may provide a force against the housing that causes the latching portion 132 to be secured to the housing with limited to no movement or slack when the latch portion is engaged with the notch. In some embodiments, the force of the rib 1100 is due to the rib 1100 being compressed during the insertion of the band latch mechanism into the housing, like can be seen in FIG. 17C; it may then remain in a less-compressed state after the insertion and the latching edge 952 is in the notch 112, such as depicted in FIG. 17D. In some embodiments, the rib may be compressible by at least substantially 0.03 millimeters. Referring back to FIG. 18, in some embodiments the rib 1100 may have a depth 1896H of substantially 0.35 millimeters ("substantially" here means within +/−5%).

Figure 20:
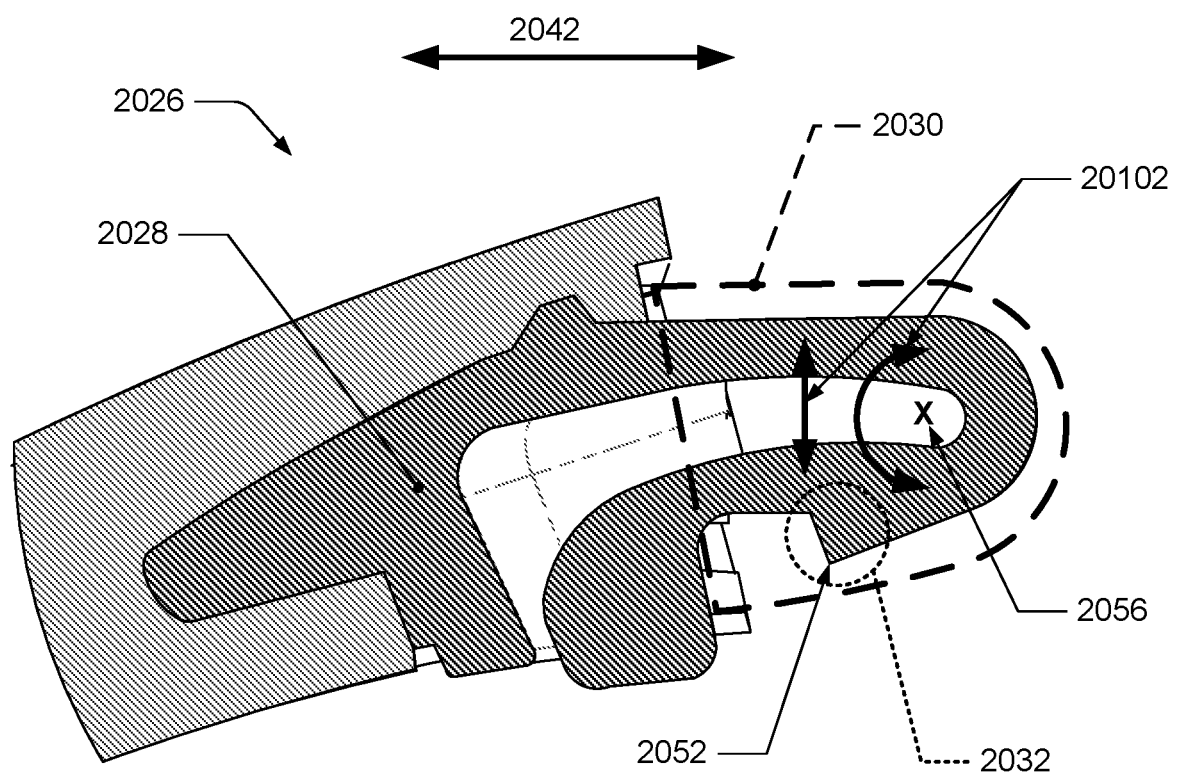
FIG. 20 depicts a cross-sectional view of an example band latch mechanism having a contiguous body portion, insertion portion, and latching portion.

In other embodiments, the latching portion may be contiguous with the insertion portion, as well as contiguous with the body portion. For example, FIG. 20 depicts a cross-sectional view of an example band latch mechanism having a contiguous body portion, insertion portion, and latching portion. As can be seen, the body portion 2028, the insertion portion 2030, and the latching portion 2032 are one single, unitary body. Here, the latching portion 2032, identified within the dotted-line circle and having the latching edge 2052, is a part of the insertion portion 2030, which is contained within the dashed-line shape. Similar to described above, the band latch mechanism 2026 is configured so that the latching edge 2052 is displaceable between the first position and the second position, but here, the body portion 2028, insertion portion 2030, and latching portion 2032 are comprised of an elastically deformable material and shaped to enable movement of the latching portion 2032 so the latching edge 2052 can be in the first and second positions like described above. This elasticity of the material and the shape of this band latch mechanism 2026, such as the insertion portion 2030 and the latching portion 2032, are the force biasing portion which causes the latching edge 2052 to return from the second position to the first position and other positions in-between. For instance, the insertion portion 2030 may move during the displacement of the latching portion 2032 and the latching portion 2032 may be rotatable about a rotation axis and also displaceable along an axis perpendicular to the first direction 2042, as indicated by the two directional arrows 20102 in FIG. 20.

It is to be understood that the above disclosure, while focusing on a particular example implementation or implementations, is not limited to only the discussed example, but may also apply to similar variants and mechanisms as well, and such similar variants and mechanisms are also considered to be within the scope of this disclosure.

What is claimed is:

1. An apparatus comprising:
  a body portion that is configured to be connected to a band and includes a recess with a first cross-sectional area when viewed along a direction perpendicular to a top surface of the body portion,
  an insertion portion that extends away from the body portion and is contained within a prismatic reference volume that extends away from the body portion in a first direction, wherein:
    the prismatic reference volume has a second cross-sectional area in a plane perpendicular to the first direction,
    the second cross-sectional area has a rounded-corner rectangular shape of substantially 26.8 millimeters by substantially 2.16 millimeters and corners radiused substantially 0.80 millimeters, and
    the insertion portion has at least a third cross-sectional area in a plane perpendicular to the first direction that is circumscribed by the rounded-corner rectangular shape;
  a latching portion that has a latching edge that is configured to be displaceable between a first position and a second position, wherein:
    in the first position, the latching edge is outside the prismatic volume, and
    in the second position, the latching edge is within the prismatic volume; and
  a force biasing portion that is configured to cause the latching edge to be in the first position, wherein:
    the recess is configured to permit the movement of the latching portion between the first position and the second position.

2. The apparatus of claim 1, wherein the insertion portion and the latching portion are both comprised of a non-metallic material.

3. The apparatus of claim 1, wherein the exterior surface of the insertion portion and the exterior surface of the latching portion are both comprised of a non-metallic material.

4. The apparatus of claim 1, wherein the surfaces of the insertion portion and the latching portion that contact a housing of a fitness monitoring device when the insertion portion and the latching portion are inserted into a cavity of the housing are comprised of a non-metallic material.

5. The apparatus of claim 1, wherein in the first position, when the insertion portion and the latching portion are inserted into a cavity of a housing of a fitness monitoring device, the latching edge is located within a notch of the cavity.

6. The apparatus of claim 1, wherein the latching portion is rotatably connected to the insertion portion such that the latching portion is rotatable about a rotation axis.

7. The apparatus of claim 6, further comprising a pin, wherein:
  the insertion portion further includes a first protrusion and a second protrusion that are offset from each other in a second direction that is perpendicular to the first direction,
  the rotation axis extends between the first protrusion and the second protrusion,
  a first end of the pin is positioned in the first protrusion, a second end of the pin is positioned in the second protrusion, and the pin extends between the first protrusion and the second protrusion,
  the latching portion further includes a latching body having a hole that extends through the latching body in a direction parallel to the latching edge, and
  the pin extends through the hole of the latching body to rotatably connect the latching portion to the first protrusion and the second protrusion, such that the latching portion is rotatable about the pin.

8. The apparatus of claim 7, wherein:
  the insertion portion and the latching portion are both comprised of a non-metallic material, and
  the force biasing portion and the pin are both comprised of a metallic material.

9. The apparatus of claim 8, wherein:
  the force biasing portion is within the prismatic reference volume, and
  the pin is within the prismatic reference volume.

10. The apparatus of claim 7, wherein:
  the force biasing portion is a torsion spring,
  a first end of the torsion spring is connected to the latching portion,
  a second end of the torsion spring contacts one or more of the body portion and the insertion portion,
  a first section of the torsion spring is coiled around the pin,
  when the latching edge is in the first position, the torsion spring is deflected by a first amount, and
  when the latching portion is in the second position, the torsion spring is deflected by a second amount that is greater than the first amount.

11. The apparatus of claim 10, wherein the torsion spring has four active coils, a mean coil diameter of substantially 1.35 millimeters, a wire diameter of substantially 0.35 millimeters, and a deflection angle of at least 20 degrees.

12. The latching mechanism of claim 6, wherein the rotational distance between the first position and the second position is about twenty degrees.

13. The apparatus of claim 1, wherein:
  a first width of the insertion portion is substantially 26.6 millimeters,
  a first thickness of the insertion portion is substantially 2 millimeters, and
  a first length of the insertion portion is substantially 3.1 millimeters.

14. The apparatus of claim 1, wherein:
  the latching portion further includes a latching lever that is connected to the latching edge, and
  the latching lever has a fourth cross-sectional area in a plane perpendicular to the first direction that is less than the first cross-sectional area of the recess.

15. The apparatus of claim 1, wherein the latching portion further comprises a first surface and a second surface that intersect to form the latching edge.

16. The apparatus of claim 15, wherein the internal angle between the first surface and the second surface is about 95 degrees or less.

17. The apparatus of claim 1, wherein:
the body portion is connected to the band,
the band includes a band body portion and a rib,
the rib is comprised of a compliant material, extends from the band body portion, and extends around a section of the body portion, the insertion portion, and the latching portion.

18. The apparatus of claim 17, wherein the rib is compressible by substantially 0.03 millimeters.

19. The apparatus of claim 1, wherein the latching portion is contiguous with the insertion portion.

20. The apparatus of claim 1, wherein the body portion is contiguous with the insertion portion.

* * * * *